US010820606B2

(12) United States Patent
Cilliers et al.

(10) Patent No.: US 10,820,606 B2
(45) Date of Patent: Nov. 3, 2020

(54) METHODS FOR INCREASING THE CLARITY AND REFRESHING ATTRIBUTES AND REDUCING THE BITTERNESS AND ASTRINGENCY OF GREEN TEA

(71) Applicant: NESTEC S.A., Vevey (CH)

(72) Inventors: Johannes Cilliers, Marysville, OH (US); Lawrence Carns, Dublin, OH (US)

(73) Assignee: Societe des Produits Nestle S.A., Vevey (CH)

( * ) Notice: Subject to any disclaimer, the term of this patent is extended or adjusted under 35 U.S.C. 154(b) by 984 days.

(21) Appl. No.: 15/106,441

(22) PCT Filed: Dec. 16, 2014

(86) PCT No.: PCT/EP2014/078084
§ 371 (c)(1),
(2) Date: Jun. 20, 2016

(87) PCT Pub. No.: WO2015/091568
PCT Pub. Date: Jun. 25, 2015

(65) Prior Publication Data
US 2017/0000150 A1  Jan. 5, 2017

(30) Foreign Application Priority Data

Dec. 18, 2013 (WO) .................. PCT/US2013/076116

(51) Int. Cl.
*A23F 3/38* (2006.01)
*A23F 3/16* (2006.01)
(Continued)

(52) U.S. Cl.
CPC ................ *A23F 3/38* (2013.01); *A23F 3/163* (2013.01); *A23F 3/20* (2013.01); *A23F 3/30* (2013.01);
(Continued)

(58) Field of Classification Search
None
See application file for complete search history.

(56) References Cited

U.S. PATENT DOCUMENTS 5,258,188 A * 11/1993 Barmentlo .............. A23F 3/166
426/422
5,538,750 A * 7/1996 Yamaguchi ............... A23F 3/26
426/385
(Continued)

FOREIGN PATENT DOCUMENTS

EP 2022346 2/2009
EP 2177108 4/2010
(Continued)

OTHER PUBLICATIONS

Tagata, "Green Tea Beverage Market, O-i Ocha", Itoen Corporation, New Food Industry, 2013, vol. 55, No. 4, pp. 61-70.
(Continued)

*Primary Examiner* — Tamra L. Dicus
(74) *Attorney, Agent, or Firm* — K&L Gates LLP

(57) ABSTRACT

Methods for modulating the bitterness and astringency of green tea, and nutritional products having a green tea with reduced bitterness and astringency, are provided. In a general embodiment, the methods comprise performing microfiltration on green tea extract to form a microfiltration retentate and a microfiltration permeate; performing at least one of ultrafiltration or reduced temperature fractionation on the microfiltration permeate; and using the ultrafiltration permeate from the ultrafiltration or the supernatant from the reduced temperature fractionation to make a green tea product. The ultrafiltration permeate or the supernatant can be further concentrated, spray or freeze dried to form a powder, used as a concentrate, or diluted to form a ready-to-drink beverage. In an embodiment, the ultrafiltration is performed on the microfiltration permeate to form an ultra-
(Continued)

filtration retentate and an ultrafiltration permeate and then the reduced temperature fractionation is performed on the ultrafiltration permeate to form a supernatant and a sediment.

21 Claims, 36 Drawing Sheets

(51) Int. Cl.
*A23F 3/20* (2006.01)
*A23F 3/30* (2006.01)

(52) U.S. Cl.
CPC ..... *A23V 2002/00* (2013.01); *A23V 2250/214* (2013.01); *A23V 2300/18* (2013.01); *A23V 2300/34* (2013.01)

(56) References Cited

U.S. PATENT DOCUMENTS

| | | | |
|---|---|---|---|
| 5,879,733 A * | 3/1999 | Ekanayake | A23F 3/163 426/271 |
| 2005/0084544 A1 * | 4/2005 | Ekanayake | C07C 231/22 424/725 |
| 2006/0263454 A1 | 11/2006 | Sugiyama et al. | |

FOREIGN PATENT DOCUMENTS

| | | |
|---|---|---|
| JP | H0445744 A | 2/1992 |
| JP | H11243927 A | 9/1999 |
| JP | 2001057847 A | 3/2001 |
| JP | 2003199495 A | 7/2003 |
| JP | 2005040030 A | 2/2005 |
| JP | 2006129757 A | 5/2006 |
| JP | 2011015657 A | 1/2011 |
| JP | 2012055205 A | 3/2012 |
| WO | 2005122779 | 12/2005 |

OTHER PUBLICATIONS

Ramarethinam et al. "Standardization of conditions for effective clarification and concentration of green tea extract by membrane filtration" Journal of Scientific & Industrial Research, 2006, vol. 65, pp. 821-825.

Kawakatsu et al. "Clarification of Green Tea Extract by Microfiltration and Ultrafiltration" Biosci. Biotech. Biochem., 1995, vol. 59, No. 6, pp. 1016-1020.

Kumar et al. "Selective Extraction of (−)Epigallocatechin Gallate from Green Tea Leaves Using Two-Stage Infusion Coupled with Membrane Separation" Food Bioprocess Technol, 2012, vol. 5, pp. 2568-2577.

* cited by examiner

Permeate Stream

FIG. 2A

| Sample # | 49207.01 | 51486.16 | 51486.14 | 49207.08 | 49207.06 | 49207.04 | 49207.02 | 51486.21 | 51486.02 | 51486.19 | 51486.04 | 51486.06 | 51486.08 | 51486.10 | 51486.12 |
|---|---|---|---|---|---|---|---|---|---|---|---|---|---|---|---|
| | Choladi Feed | CPP MF Feed (Choladi) | MF Permeate | UF 500 Permeate | UF 1000 Permeate | UF 5000 Permeate | UF 10000 Permeate | CPP 10000 Permeate Bench | UF 25000 Permeate | CPP 25000 Permeate Bench | UF 50000 HT Permeate | UF 50000 Reg Permeate | UF 100000 Reg Permeate | UF 100000 Pos Permeate | UF 100000 Neg Permeate |
| caffeine | 5.7 | 5.8 | 5.5 | 0.0 | 0.0 | 8.7 | 8.3 | 8.9 | 7.5 | 7.3 | 6.9 | 6.2 | 6.7 | 6.8 | 6.9 |
| GA | 0.1 | 0.1 | 0.1 | 0.3 | 0.0 | 0.2 | 0.2 | 0.2 | 0.2 | 0.2 | 0.1 | 0.1 | 0.1 | 0.1 | 0.1 |
| GC | 1.6 | 1.6 | 1.6 | 0.0 | 0.0 | 2.9 | 2.7 | 2.8 | 2.5 | 2.4 | 2.2 | 2.0 | 2.1 | 2.1 | 2.1 |
| EGC | 8.2 | 7.7 | 8.2 | 0.0 | 0.0 | 16.2 | 14.6 | 14.4 | 13.3 | 11.9 | 11.2 | 10.3 | 10.5 | 10.3 | 10.5 |
| catechin | 0.7 | 0.7 | 0.7 | 0.0 | 0.0 | 0.8 | 0.8 | 0.8 | 0.8 | 0.7 | 0.8 | 0.7 | 0.8 | 0.7 | 0.8 |
| EC | 2.2 | 2.3 | 2.3 | 0.0 | 0.0 | 4.6 | 4.1 | 4.3 | 3.7 | 3.4 | 3.1 | 2.8 | 2.9 | 2.9 | 2.9 |
| EGCG | 15.6 | 15.8 | 14.9 | 0.0 | 0.0 | 15.3 | 15.6 | 14.8 | 18.2 | 16.5 | 18.4 | 16.6 | 17.9 | 17.9 | 18.5 |
| GCG | 0.6 | 0.6 | 0.6 | 0.0 | 0.0 | 0.6 | 0.6 | 0.6 | 0.6 | 0.6 | 0.7 | 0.6 | 0.7 | 0.6 | 0.7 |
| ECG | 3.6 | 3.5 | 3.3 | 0.0 | 0.0 | 3.3 | 3.4 | 3.4 | 4.0 | 3.7 | 3.9 | 3.6 | 3.9 | 3.8 | 4.1 |
| CG | 0.1 | 0.0 | 0.0 | 0.0 | 0.0 | 0.1 | 0.1 | 0.1 | 0.1 | 0.1 | 0.1 | 0.1 | 0.1 | 0.1 | 0.1 |
| Total Catechins (HPLC) | 32.9 | 32.4 | 31.5 | 0.0 | 0.0 | 44.1 | 42.2 | 41.1 | 43.2 | 39.3 | 40.3 | 36.6 | 38.7 | 38.5 | 39.7 |
| Total Solids Content (TC) | 1.93 | 1.84 | 1.19 | 0.01 | 0.02 | 1.26 | 0.50 | 0.40 | 0.77 | 0.75 | 1.09 | 1.21 | 1.27 | 1.20 | 1.26 |
| Total Solids Content (B) | | 1.31 | | 0.02 | 0.03 | 0.42 | 0.50 | | | 0.86 | 1.20 | 1.24 | 1.39 | 1.33 | 1.41 |

FIG. 2B

Retentate Benchmark

| Sample # | 49207.01 | 51486.16 | 51486.15 | 49207.09 | 49207.07 | 49207.05 | 49207.03 | 51486.22 | 51486.03 | 51486.20 | 51486.05 | 51486.07 | 51486.09 | 51486.11 | 51486.13 |
|---|---|---|---|---|---|---|---|---|---|---|---|---|---|---|---|
| | Cholad Feed | CPP/MF Feed (Cholad) | MF Retentate | UF 500 Retentate | UF 1000 Retentate | UF 5000 Retentate | UF 10000 Retentate | CPP 10000 Retentate Bench | UF 25000 Retentate | CPP 25000 Retentate Bench | UF 50000 HT Retentate | UF 50000 Reg Retentate | UF 100000 Reg Retentate | UF 100000 Pos Retentate | UF 120000 Neg Retentate |
| caffeine | 5.7 | 5.8 | 5.5 | 5.7 | 5.7 | 5.5 | 5.5 | 6.0 | 5.9 | 6.1 | 5.5 | 5.3 | 5.3 | 5.5 | 5.5 |
| GA | 0.1 | 0.1 | 0.1 | 0.1 | 0.1 | 0.1 | 0.2 | 0.1 | 0.1 | 0.1 | 0.1 | 0.1 | 0.1 | 0.1 | 0.1 |
| GC | 1.6 | 1.6 | 1.5 | 1.6 | 1.6 | 1.5 | 1.5 | 1.7 | 1.6 | 1.7 | 1.5 | 1.4 | 1.4 | 1.5 | 1.5 |
| EGC | 8.2 | 7.7 | 7.2 | 7.7 | 7.7 | 7.5 | 7.0 | 8.0 | 7.9 | 8.2 | 7.3 | 6.9 | 6.3 | 7.1 | 7.1 |
| catechin | 0.7 | 0.7 | 0.7 | 0.7 | 0.7 | 0.7 | 0.7 | 0.7 | 0.8 | 0.8 | 0.7 | 0.7 | 0.7 | 0.7 | 0.7 |
| EC | 2.2 | 2.3 | 2.1 | 2.2 | 2.2 | 2.1 | 2.1 | 2.3 | 2.2 | 2.3 | 2.1 | 2.0 | 1.9 | 2.1 | 2.1 |
| EGCG | 15.8 | 15.8 | 15.2 | 15.5 | 15.6 | 15.6 | 15.3 | 16.4 | 16.8 | 16.4 | 15.1 | 14.7 | 14.6 | 15.3 | 15.2 |
| GCG | 0.6 | 0.6 | 0.6 | 0.6 | 0.6 | 0.6 | 0.6 | 0.7 | 0.6 | 0.7 | 0.6 | 0.6 | 0.6 | 0.6 | 0.6 |
| ECG | 3.6 | 3.5 | 3.4 | 3.5 | 3.5 | 3.5 | 3.4 | 3.7 | 3.8 | 3.7 | 3.4 | 3.3 | 3.3 | 3.4 | 3.4 |
| CG | 0.1 | 0.0 | 0.0 | 0.0 | 0.0 | 0.1 | 0.0 | 0.1 | 0.0 | 0.1 | 0.0 | 0.0 | 0.0 | 0.0 | 0.0 |
| Total Catechins (HPLC) | 32.9 | 32.4 | 30.7 | 31.9 | 32.1 | 31.7 | 30.8 | 33.5 | 33.7 | 33.8 | 30.7 | 29.8 | 28.8 | 30.9 | 30.6 |
| Total Solids Content (Tc) | 1.93 | 1.84 | 2.08 | 2.70 | 2.74 | 2.59 | 2.53 | 2.05 | 2.28 | 1.76 | 2.26 | 2.45 | 2.59 | 2.12 | 2.14 |
| Total Solids Content (°B) | | 1.31 | | 2.74 | 2.80 | 2.64 | 2.51 | | | 1.95 | 2.23 | 2.47 | 2.51 | 2.16 | 2.18 |

FIG. 3A

| Sample # | | Choladi Feed 49207.01 | CPP MF Feed (Choladi) 51486.16 | MF Permeate 51486.14 | UF 500 Permeate 49209.08 | UF 1000 Permeate 49207.06 | UF 5000 Permeate 49207.04 | UF 10000 Permeate 49207.02 | CPP 10000 Permeate Bench 51486.21 | UF 25000 Permeate 51486.02 | CPP 25000 Permeate Bench 51486.19 | UF 50000 HT Permeate 51486.04 | UF 50000 Reg Permeate 51486.06 | UF 100000 Reg Permeate 51486.08 | UF 100000 Pos Permeate 51486.10 | UF 120000 Neg Permeate 51486.12 |
|---|---|---|---|---|---|---|---|---|---|---|---|---|---|---|---|---|
| 1 | m-gal | 59 | 54 | 71 | 0 | 0 | 33 | 36 | 37 | 56 | 41 | 70 | 53 | 69 | 28 | 56 |
| 2 | ? | 30 | 35 | 27 | 0 | 0 | 5 | 8 | 9 | 19 | 19 | 27 | 24 | 29 | 53 | 31 |
| 3 | m-glc | 71 | 74 | 73 | 0 | 0 | 16 | 13 | 35 | 53 | 51 | 67 | 58 | 70 | 68 | 73 |
| 4 | ? | 2 | 4 | 2 | 0 | 0 | 1 | 1 | 1 | 1 | 1 | 1 | 1 | 1 | 2 | 2 |
| 5 | q-gal-rut | 31 | 34 | 30 | 0 | 0 | 2 | 5 | 5 | 13 | 13 | 24 | 21 | 27 | 26 | 28 |
| 6a | ? | 17 | 17 | 17 | 0 | 0 | 4 | 6 | 7 | 12 | 12 | 16 | 15 | 17 | 17 | 18 |
| 6b | q-glc-rut | 81 | 86 | 84 | 0 | 0 | 2 | 14 | 14 | 37 | 38 | 69 | 60 | 77 | 75 | 81 |
| 6c | ? | 12 | 12 | 12 | 0 | 0 | 2 | 5 | 6 | 8 | 10 | 11 | 10 | 10 | 10 | 11 |
| 7 | q-ga-rha ? | 15 | 16 | 15 | 0 | 0 | 10 | 4 | 4 | 8 | 8 | 14 | 11 | 15 | 13 | 15 |
| 8 | RUTN | 93 | 93 | 96 | 0 | 0 | 11 | 31 | 29 | 53 | 56 | 83 | 72 | 89 | 85 | 93 |
| 9 | q-hex-rha-rha | 45 | 46 | 47 | 0 | 0 | 8 | 25 | 26 | 35 | 34 | 44 | 38 | 46 | 43 | 47 |
| 10 | q-glc | 37 | 37 | 39 | 0 | 0 | 1 | 20 | 20 | 30 | 28 | 36 | 32 | 38 | 36 | 38 |
| 11 | k-glc-rut | 12 | 13 | 13 | 0 | 0 | 8 | 1 | 2 | 4 | 6 | 9 | 8 | 11 | 11 | 12 |
| 12 | k-gal | 86 | 85 | 88 | 0 | 0 | 17 | 14 | 16 | 38 | 42 | 71 | 61 | 79 | 75 | 83 |
| 13 | knd | 59 | 59 | 62 | 0 | 0 | 17 | 23 | 23 | 38 | 38 | 55 | 48 | 59 | 56 | 61 |
| 14 | k-glc | 27 | 28 | 29 | 0 | 0 | 13 | 15 | 15 | 21 | 21 | 27 | 23 | 29 | 28 | 29 |
| | myncetin | 0 | 0 | 0 | 0 | 0 | 0 | 0 | 0 | 0 | 0 | 0 | 0 | 0 | 0 | 0 |
| | quercetin | 5 | 4 | 5 | 0 | 0 | 2 | 3 | 0 | 2 | 2 | 4 | 2 | 4 | 4 | 5 |
| | kaempferol | 4 | 4 | 4 | 0 | 0 | 1 | 1 | 1 | 2 | 2 | 3 | 2 | 3 | 2 | 3 |
| Total glycosides | | 678 | 692 | 705 | 0 | 0 | 133 | 222 | 251 | 425 | 418 | 623 | 534 | 664 | 624 | 678 |
| Total aglycones | | 8 | 9 | 9 | 0 | 0 | 2 | 4 | 1 | 4 | 4 | 7 | 5 | 8 | 6 | 8 |
| Total all | | 686 | 700 | 714 | 0 | 0 | 135 | 226 | 252 | 429 | 422 | 630 | 539 | 672 | 630 | 685 |

FIG. 3B

| Sample # | | 49207.01 Choladi Feed | 51486.16 CPP MF Feed (Choladi) | 51486.15 MF Retentate | 49210.09 UF 500 Retentate | 49207.07 UF 1000 Retentate | 49207.05 UF 5'000 Retentate | 49207.03 UF 10'000 Retentate | 51486.22 CPP 10'000 Retentate Bench | 51486.03 UF 25'000 Retentate | 51486.20 CPP 25'000 Retentate Bench | 51486.05 UF 50'000 HT Retentate | 51486.07 UF 50'000 Reg Retentate | 51486.09 UF 100'000 Reg Retentate | 51486.11 UF 100'000 Pos Retentate | 51486.13 UF 120'000 Neg Retentate |
|---|---|---|---|---|---|---|---|---|---|---|---|---|---|---|---|---|
| 1 | m-gal | 59 | 54 | 62 | 61 | 59 | 58 | 63 | 86 | 90 | 67 | 70 | 61 | 61 | 58 | 54 |
| 2 | ? | 30 | 35 | 30 | 31 | 31 | 33 | 30 | 23 | 31 | 34 | 26 | 31 | 31 | 24 | 26 |
| 3 | m-glc | 71 | 74 | 69 | 73 | 73 | 73 | 73 | 80 | 81 | 80 | 70 | 72 | 73 | 70 | 68 |
| 4 | ? | 2 | 4 | 2 | 2 | 2 | 3 | 2 | 2 | 2 | 2 | 2 | 2 | 2 | 2 | 2 |
| 5 | q-gal-rut | 31 | 34 | 31 | 32 | 33 | 32 | 33 | 37 | 37 | 38 | 31 | 34 | 32 | 31 | 30 |
| 6a | ? | 17 | 17 | 15 | 15 | 16 | 18 | 20 | 18 | 18 | 18 | 16 | 16 | 15 | 16 | 16 |
| 6b | q-glc-rut | 81 | 86 | 86 | 88 | 88 | 88 | 88 | 99 | 103 | 100 | 88 | 91 | 88 | 88 | 85 |
| 6c | ? | 12 | 12 | 10 | 11 | 12 | 13 | 15 | 13 | 12 | 13 | 11 | 12 | 11 | 10 | 10 |
| 7 | q-gal-rha ? | 15 | 16 | 16 | 17 | 17 | 17 | 17 | 18 | 20 | 18 | 17 | 18 | 17 | 16 | 15 |
| 8 | RUTIN | 93 | 93 | 93 | 96 | 97 | 99 | 101 | 108 | 112 | 109 | 96 | 99 | 96 | 95 | 93 |
| 9 | q-hex-rha-rha | 45 | 46 | 45 | 48 | 48 | 48 | 50 | 53 | 53 | 52 | 45 | 48 | 48 | 45 | 43 |
| 10 | q-glc | 37 | 37 | 36 | 38 | 38 | 39 | 41 | 43 | 44 | 42 | 37 | 39 | 38 | 37 | 36 |
| 11 | k-glc-rut | 12 | 13 | 12 | 13 | 13 | 14 | 15 | 15 | 16 | 15 | 13 | 14 | 13 | 13 | 13 |
| 12 | k-ga | 86 | 85 | 85 | 88 | 88 | 92 | 93 | 101 | 105 | 101 | 89 | 92 | 88 | 89 | 86 |
| 13 | k-rut | 59 | 59 | 59 | 56 | 61 | 62 | 62 | 64 | 70 | 68 | 61 | 62 | 56 | 60 | 59 |
| 14 | k-glc | 27 | 28 | 28 | 28 | 29 | 29 | 29 | 32 | 31 | 32 | 28 | 29 | 28 | 28 | 27 |
| | myricetin | 0 | 0 | 0 | 0 | 0 | 0 | 0 | 0 | 0 | 0 | 0 | 0 | 0 | 0 | 0 |
| | quercetin | 5 | 4 | 5 | 5 | 5 | 5 | 5 | 5 | 6 | 6 | 6 | 5 | 5 | 5 | 5 |
| | kaempferol | 4 | 4 | 4 | 4 | 4 | 4 | 4 | 4 | 5 | 4 | 4 | 4 | 4 | 4 | 4 |
| Total glycosides | | 678 | 692 | 675 | 696 | 703 | 718 | 730 | 791 | 825 | 790 | 699 | 718 | 686 | 681 | 661 |
| Total aglycones | | 8 | 9 | 9 | 9 | 9 | 9 | 9 | 10 | 10 | 10 | 10 | 10 | 9 | 9 | 9 |
| Total all | | 686 | 700 | 684 | 705 | 712 | 727 | 739 | 801 | 835 | 799 | 708 | 728 | 705 | 689 | 670 |

FIG. 5

| Membrane | Starting volume (g) | Flux with water (g/min) | Flux with tea (g/min) | Flux (LMH) | Permeate Volume (g) | Retentate (by calculation) | Tea Solids by Densitometry (°B) Feed | Tea Solids by Densitometry (°B) Permeate | Tea Solids by Densitometry (°B) Retentate | Tea Solids Analytical (%) Feed | Tea Solids Analytical (%) Permeate | Tea Solids Analytical (%) Retentate | Appearance | Comments |
|---|---|---|---|---|---|---|---|---|---|---|---|---|---|---|
| 500 | 800 | 1.1 | 1.4 | 10.3 | 260 | 540 | | 0.016 | 2.744 | | 0.01 | 2.70 | Water | Membrane fairly clean |
| 1000 | 800 | 1.6 | 1.3 | 7.7 | 260 | 540 | | 0.031 | 2.799 | | 0.02 | 2.73 | Water | Membrane fairly clean |
| 5000 | 800 | 9.0 | 1.6 | 10.8 | 264 | 536 | | 0.415 | 2.639 | | 0.41 | 2.59 | Very light straw | Membrane fairly clean |
| 10'000 | 800 | | | 16.3 | 217 | 583 | | 0.498 | 2.507 | | 0.50 | 2.53 | Light straw | Membrane fouled |
| 25'000 | 800 | 12.5 | 3.8 | | 300 | 500 | 1.951 | 0.858 | 1.951 | | 0.77 | 2.28 | Light straw | Membrane fouled |
| 50'000 High temp | 800 | 18.3 | 7.0 | | 269 | 531 | | 1.200 | 2.226 | 1.88 | 1.09 | 2.20 | Light yellow | Membrane fouled |
| 50'000 Regular | 800 | — | 5.2 | | 280 | 520 | — | 1.239 | 2.468 | | 1.21 | 2.45 | Yellow | Membrane fouled |
| 100'000 Regular | 800 | 35.6 | 7.9 | | 471 | 329 | — | 1.391 | 2.608 | | 1.27 | 2.59 | Dark yellow | Membrane very dirty |
| 100'000 Positive | 800 | 20.6 | 6.1 | | 260 | 540 | | 1.330 | 2.155 | | 1.20 | 2.12 | Dark yellow | Membrane fairly clean |
| 120'000 Negative | 800 | 57.0 | 10.1 | | 260 | 540 | | 1.408 | 2.176 | | 1.26 | 2.14 | Dark yellow | Membrane fairly clean |
| Microfiltration | 800 | 12.2 | 7.6 | | 288 | 512 | | 1.313 | 2.102 | | 1.19 | 2.08 | Dark yellow | Membrane sl. Fouled |
| CPP Run Microfiltration | | | | | | | | | | | | | | |
| CPP 25'000 | 800 | 9.6 | 2.3* | | 200 | 600 | 1.892 | 1.643 | 1.813 | 1.84 | 1.54 | 1.79 | Dark yellow | Unknown |
| | 800 | 22.5 | 2.1** | | 260 | 540 | | 0.797 | 1.872 | | 0.77 | 1.76 | Light straw | Membrane sl. Fouled |
| CPP 10'000 | | | | | | | | 0.409 | 2.182 | | 0.40 | 2.05 | Very light straw | Membrane mod. Fouled |

* = flux constant throughout whole process
** = flux decreased throughout whole process

FIG. 6

| Sample Description | MF Feed | MF Retentate | MF Permeate | UF Retentate | UF Permeate |
|---|---|---|---|---|---|
| caffeine | 5.2 | 4.5 | 5.6 | 5.4 | 5.5 |
| GA | 0.1 | 0.1 | 0.1 | 0.1 | 0.1 |
| GC | 2.2 | 1.9 | 2.3 | 2.2 | 2.5 |
| EGC | 7.6 | 6.2 | 8.1 | 7.7 | 8.8 |
| catechin | 0.6 | 0.6 | 0.7 | 0.7 | 0.7 |
| EC | 2.1 | 1.8 | 2.3 | 2.2 | 2.5 |
| EGCG | 13.1 | 11.3 | 13.7 | 13.4 | 13.2 |
| GCG | 0.8 | 0.7 | 0.8 | 0.8 | 0.8 |
| ECG | 3.3 | 3.0 | 3.5 | 3.4 | 3.2 |
| CG | 0.1 | 0.1 | 0.1 | 0.1 | 0.1 |
| Total Catechins (HPLC) | 29.8 | 25.5 | 31.5 | 30.4 | 31.7 |
| Total Polyphenols (FC) | 26.9 | 30.1 | 29.2 | 29.0 | 27.1 |
| Total Solids Content (Tc) | 3.90 | 4.86 | 3.59 | 3.83 | 2.92 |
| Total Solids Content (°B) | 4.02 | 4.66 | 3.82 | 4.02 | 3.10 |
| NesTMS Sample # | 74096.01 | 74096.02 | 74096.03 | 74096.04 | 74096.05 |

FIG. 9

| Sample Description | Peak Code | Abbreviation | MF Feed | MF Retentate | MF Permeate | UF Retentate | UF Permeate |
|---|---|---|---|---|---|---|---|
| myricetin galactoside | 1 | m-gal | 54 | 45 | 57 | 61 | 50 |
| unidentified | 2 | ? | 11 | 9 | 11 | 11 | 10 |
| myricetin glucoside | 3 | m-glc | 48 | 41 | 51 | 54 | 46 |
| unidentified | 4 | ? | 2 | 1 | 2 | 1 | 1 |
| quercetin rutinosyl galactoside | 5 | q-gal-rut | 19 | 16 | 20 | 22 | 16 |
| unidentified | 6a | ? | 6 | 6 | 7 | 7 | 6 |
| quercetin rutinosyl glucoside | 6b | q-glc-rut | 45 | 39 | 48 | 53 | 38 |
| unidentified | 6c | ? | 6 | 5 | 6 | 7 | 6 |
| quercetin rhamnosyl galactoside | 7 | q-gal-rha ? | 10 | 9 | 11 | 12 | 9 |
| rutin (quercetin rutinoside) | 8 | RUTIN | 61 | 53 | 64 | 70 | 56 |
| quercetin-hexose-rha-rha | 9 | q-hex-rha-rha | 30 | 26 | 32 | 35 | 29 |
| quercetin glucoside | 10 | q-glc | 23 | 20 | 25 | 26 | 22 |
| kaempferol rutinosyl glucoside | 11 | k-glc-rut | 6 | 6 | 7 | 8 | 5 |
| kaempferol galactoside | 12 | k-gal | 37 | 32 | 40 | 43 | 32 |
| kaempferol rutinoside | 13 | k-rut | 30 | 25 | 32 | 34 | 28 |
| kaempferol glucoside | 14 | k-glc | 11 | 10 | 12 | 13 | 11 |
| Sample # | | | 74096.01 | 74096.02 | 74096.03 | 74096.04 | 74096.05 |

FIG. 25

| Sample Description | MF Feed | MF Permeate | MF Supernatant | UF-Permeate-Supernatant | UF-Retentate-Supernatant |
|---|---|---|---|---|---|
| caffeine | 5.2 | 5.6 | 4.4 | 4.5 | 4.0 |
| GA | 0.1 | 0.1 | 0.1 | 0.1 | 0.1 |
| GC | 2.2 | 2.3 | 2.5 | 2.6 | 2.4 |
| EGC | 7.6 | 8.1 | 8.6 | 9.1 | 8.4 |
| catechin | 0.6 | 0.7 | 0.7 | 0.7 | 0.8 |
| EC | 2.1 | 2.3 | 2.4 | 2.6 | 2.4 |
| EGCG | 13.1 | 13.7 | 12.1 | 11.7 | 11.5 |
| GCG | 0.8 | 0.8 | 0.8 | 0.7 | 0.7 |
| ECG | 3.3 | 3.5 | 2.9 | 2.7 | 2.8 |
| CG | 0.1 | 0.1 | 0.1 | 0.1 | 0.1 |
| Total Catechins (HPLC) | 29.8 | 31.5 | 30.0 | 30.2 | 28.9 |
| Total Polyphenols (FC) | 26.9 | 29.2 | 26.0 | 25.8 | 28.5 |
| Total Solids Content (TC) | 3.90 | 3.59 | 3.33 | 2.76 | 3.40 |
| Total Solids Content ("B) | 4.02 | 3.82 | 3.54 | 2.94 | 3.64 |
| NesTMS Sample # | 74096.01 | 74096.03 | 74558.01 | 74558.03 | 74558.05 |

FIG. 26

| Sample Description | MF Feed | MF Permeate | MF Permeate Sediment | UF Permeate Sediment | UF Retentate Sediment |
|---|---|---|---|---|---|
| caffeine | 5.2 | 5.6 | 17.8 | 20.7 | 16.6 |
| GA | 0.1 | 0.1 | 0.1 | 0.0 | 0.0 |
| GC | 2.2 | 2.3 | 0.9 | 1.0 | 0.9 |
| EGC | 7.6 | 8.1 | 2.0 | 2.2 | 2.1 |
| catechin | 0.6 | 0.7 | 0.5 | 0.4 | 0.6 |
| EC | 2.1 | 2.3 | 0.8 | 0.8 | 0.8 |
| EGCG | 13.1 | 13.7 | 29.8 | 34.3 | 29.8 |
| GCG | 0.8 | 0.8 | 2.2 | 2.4 | 2.1 |
| ECG | 3.3 | 3.5 | 8.3 | 9.2 | 8.0 |
| CG | 0.1 | 0.1 | 0.2 | 0.2 | 0.2 |
| Total Catechins (HPLC) | 29.8 | 31.5 | 44.7 | 50.5 | 44.5 |
| Total Solids (Sum) | 35.1 | 37.2 | 62.6 | 71.3 | 61.1 |
| Total Polyphenols (FC) | 26.9 | 29.2 | 47.4 | 48.8 | 44.6 |
| Total Solids Content (Tc) | 3.90 | 3.59 | 1.01 | 0.68 | 1.46 |
| Total Solids Content (°B) | 4.02 | 3.82 | 0.83 | 0.51 | 1.31 |
| NesTMS Sample # | 74096.01 | 74096.03 | 74558.02 | 74558.04 | 74558.06 |

METHODS FOR INCREASING THE CLARITY AND REFRESHING ATTRIBUTES AND REDUCING THE BITTERNESS AND ASTRINGENCY OF GREEN TEA

CROSS REFERENCE TO RELATED APPLICATIONS

The present application is a National Stage of International Application No. PCT/EP2014/078084, filed on Dec. 16, 2014, which claims priority to International Application No. PCT/US2013/076116, filed Dec. 18, 2013, the entire contents of which are being incorporated herein by reference.

BACKGROUND

The present disclosure generally relates to green tea products and methods for making green tea products. More specifically, the present disclosure relates to methods for increasing the clarity and refreshing attributes and reducing the bitterness and astringency of green tea without relying on additives or chemicals.

Tea sensory characteristics are very dependent on the composition of the tea. Bitterness and astringency of tea is generally ascribed to the combination of catechins, flavonol-glycosides, saponin, caffeine, and amino acids. Although tea drinkers associate some bitterness and astringency with higher quality teas, there is still a sensitivity and a narrow threshold where astringency and bitterness is noticeable. Especially in functional beverages with high tea solids, this could be a problem. Excessive bitterness and astringency results in a loss of refreshment and enjoyment.

Many consumers confuse bitterness (a taste) and astringency (a flavor sensation), whereas to the trained sensory person these taste perceptions are different. Consumers may also have different sensitivities to these green tea attributes. As a result, there is a need for making a green tea that has a reduced bitterness and astringency while maintaining characteristic tea flavor and possibly high catechins content to keep the nutritional advantages of tea.

SUMMARY

The present disclosure provides methods for increasing the clarity and refreshing attributes and reducing the bitterness, astringency and persistency of green tea while maintaining the level of catechin antioxidants and caffeine. The methods remove a fraction from the tea that contributes very strongly to bitterness, astringency and persistency without relying on additives or chemicals and without substantial loss of characteristic tea flavor.

In an embodiment, a method for reducing and/or modulating the bitterness and astringency and/or increasing the refreshing attributes of green tea is provided. The method comprises: performing microfiltration on green tea extract to form a microfiltration retentate and a microfiltration permeate; performing ultrafiltration on the microfiltration permeate to form an ultrafiltration retentate and an ultrafiltration permeate; and using the ultrafiltration permeate to make a green tea product.

In an embodiment, the ultrafiltration is performed with a membrane having a molecular weight cutoff of 5,000 to 25,000 Da.

In an embodiment, the green tea product is made by spray drying or freeze drying the ultrafiltration permeate into a powder.

In an embodiment, the green tea product is a ready-to-drink beverage made by diluting the ultrafiltration permeate.

In an embodiment, the green tea product is made by adding the ultrafiltration permeate to a nutritional composition.

In another embodiment, a method for reducing the bitterness and astringency and/or increasing the refreshing attributes of green tea is provided. The method comprises: performing microfiltration on green tea extract to form a microfiltration retentate and a microfiltration permeate; and performing reduced temperature fractionation on the microfiltration permeate to form a supernatant and a sediment.

In another embodiment, a method for reducing the bitterness and astringency and/or increasing the refreshing attributes of green tea is provided. The method comprises: performing microfiltration on green tea extract to form a microfiltration retentate and a microfiltration permeate; performing ultrafiltration on the microfiltration permeate to form an ultrafiltration retentate and an ultrafiltration permeate; and performing reduced temperature fractionation on the ultrafiltration permeate to form a supernatant and a sediment.

In an embodiment, the method further comprises using the supernatant from the reduced temperature fractionation to make a green tea product.

In an embodiment, the method further comprises spray drying or freeze drying the supernatant into a powder.

In an embodiment, the method further comprises diluting the supernatant to make a ready-to-drink beverage.

In an embodiment, the green tea product is made by adding the supernatant to a nutritional composition.

In an embodiment, the green tea product is a concentrate.

In an embodiment, the method further comprises using the sediment from the reduced temperature fractionation to make a food product.

In an embodiment the green tea extract has a solid content between 1 and 30% before microfiltration.

In another embodiment, the green tea extract has a solids content of about 4% before the microfiltration.

In another embodiment, a product comprising green tea is provided. The product is made by removing at least a portion of flavonol-glycosides from the green tea.

In an embodiment, the flavonol-glycosides are removed by processing microfiltration of green tea extract to form a microfiltration retentate and a microfiltration permeate and then performing ultrafiltration on the microfiltration permeate to form an ultrafiltration retentate and an ultrafiltration permeate, and the green tea in the product is provided by including the ultrafiltration permeate in the product. The product can comprise at least one of a protein, a fat or a carbohydrate added to the ultrafiltration permeate.

In an embodiment, the flavonol-glycosides are removed by processing microfiltration of green tea extract to form a microfiltration retentate and a microfiltration permeate and then performing a reduced temperature fractionation on the microfiltration permeate to form a supernatant and a sediment, and the green tea in the product is provided by including the supernatant in the product.

In an embodiment, the flavonol-glycosides are removed by processing microfiltration of green tea extract to form a microfiltration retentate and a microfiltration permeate and then performing ultrafiltration on the microfiltration permeate to form an ultrafiltration retentate and an ultrafiltration permeate and then performing reduced temperature fractionation on the ultrafiltration permeate to form a supernatant and a sediment, and the green tea in the product is provided by including the supernatant in the product. The product can comprise at least one of a protein, a fat or a carbohydrate added to the supernatant.

An advantage of the present disclosure is to provide a method for increasing the clarity and reducing the bitterness, astringency and persistency of green tea relative to conventional green tea extracts.

Another advantage of the present disclosure is to manage and/or modulate bitterness, astringency and persistency while maintaining an authentic tea taste and high polyphenolic/antioxidant content.

Still another advantage of the present disclosure is to provide a green tea having a reduced bitterness, astringency and persistency and having excellent clarity and bright color.

Yet another advantage of the present disclosure is to provide a nutritional product including a green tea having a reduced bitterness, astringency and persistency.

An additional advantage of the present disclosure is to provide a green tea having a different sensory profile with much less green color and taste than standard commercial products.

Another advantage of the present disclosure is to provide a green tea which may be perceived as more sweet at a given sugar level compared to untreated tea.

Still another advantage of the present disclosure is to use membrane technology to target the removal of astringent flavor-impacting compounds such as flavonol-glycosides.

Yet another advantage of the present disclosure is to modulate and/or reduce bitterness and astringency compounds through sedimentation.

An additional advantage of the present disclosure is to provide a green tea having a different sensory profile with much less green color and taste than standard commercial products.

Another advantage of the present disclosure is to selectively remove some of bitterness and astringency flavor compounds, namely flavonol-glycosides, from green tea extract.

Still another advantage of the present disclosure is to increase refreshing attributes of green tea in a natural, physical manner instead of artificially using additives or chemicals.

Yet another advantage of the present disclosure is to reduce the bitterness, astringency and persistency of a green tea extract by removing only a small fraction of the solids.

An additional advantage of the present disclosure is to provide a green tea having less green/raw/leafy/shrubby character with more smooth overall flavor.

Another advantage of the present disclosure is to reduce perceived negative characteristics in green tea by decreasing the corresponding flavor compounds below the sensory threshold without removing these compounds completely.

Additional features and advantages are described herein, and will be apparent from, the following Detailed Description and the figures.

BRIEF DESCRIPTION OF THE FIGURES

FIGS. 2A and 2B are tables showing catechins and caffeine HPLC analytical results in permeates (FIG. 2A) and retentates (FIG. 2B) after "on-the-bench" treatment with flat-sheet membranes from 500 to 120,000 MWCO. Results are expressed on a percent solids basis.

FIGS. 3A and 3B are graphs of analytical results by HPLC (peak areas at 380 nm) of flavonol-glycosides in permeates (FIG. 3A) and retentates (FIG. 3B) of "on-the-bench" membranes testing. Reconstituted Choladi green tea extract from powder was the feed, and MF permeate from the CPP was also tested on the bench system where indicated.

FIG. 5 is a table of data collected running the flat sheet membranes using Choladi TGFT green tea powder at 2.0% tea solids content and using the bench system.

FIG. 6 is a table showing a side-by-side comparison of the catechin and caffeine composition on a percent solids basis (% db) of microfiltration (MF) feed (reconstituted commercial Choladi TGFT green tea powder), MF retentate, MF permeate, ultra filtration (UF) retentate and UF permeate. Total catechins (by HPLC) Is the sum of catechins, total polyphenols=total flavonoids (% db) by FC. Total solids measurements of the liquid streams using densitometry (° B) are included.

FIG. 9 is a table showing a side-by-side comparison of the flavonol-glycoside composition on a peak area (380 nm) basis of microfiltration (MF) feed (reconstituted Choladi TGFT green tea powder), MF retentate, MF permeate, ultrafiltration (UF) retentate and UF permeate. All samples were analyzed by HPLC at 0.20% solids content.

FIG. 25 is a graph showing an analysis of supernatant (MF and UF). Catechin and caffeine composition on a percent solids basis (% db) is compared between each sample.

FIG. 26 is a table showing an analysis of sediment (MF and UF). Catechin and caffeine composition on a percent solids basis (% db) with comparison of the composition of microfiltration (MF) feed (reconstituted Choladi TGFT green tea powder) and MF permeate.

DETAILED DESCRIPTION

Definitions of Techniques Used Herein

Figure 1:
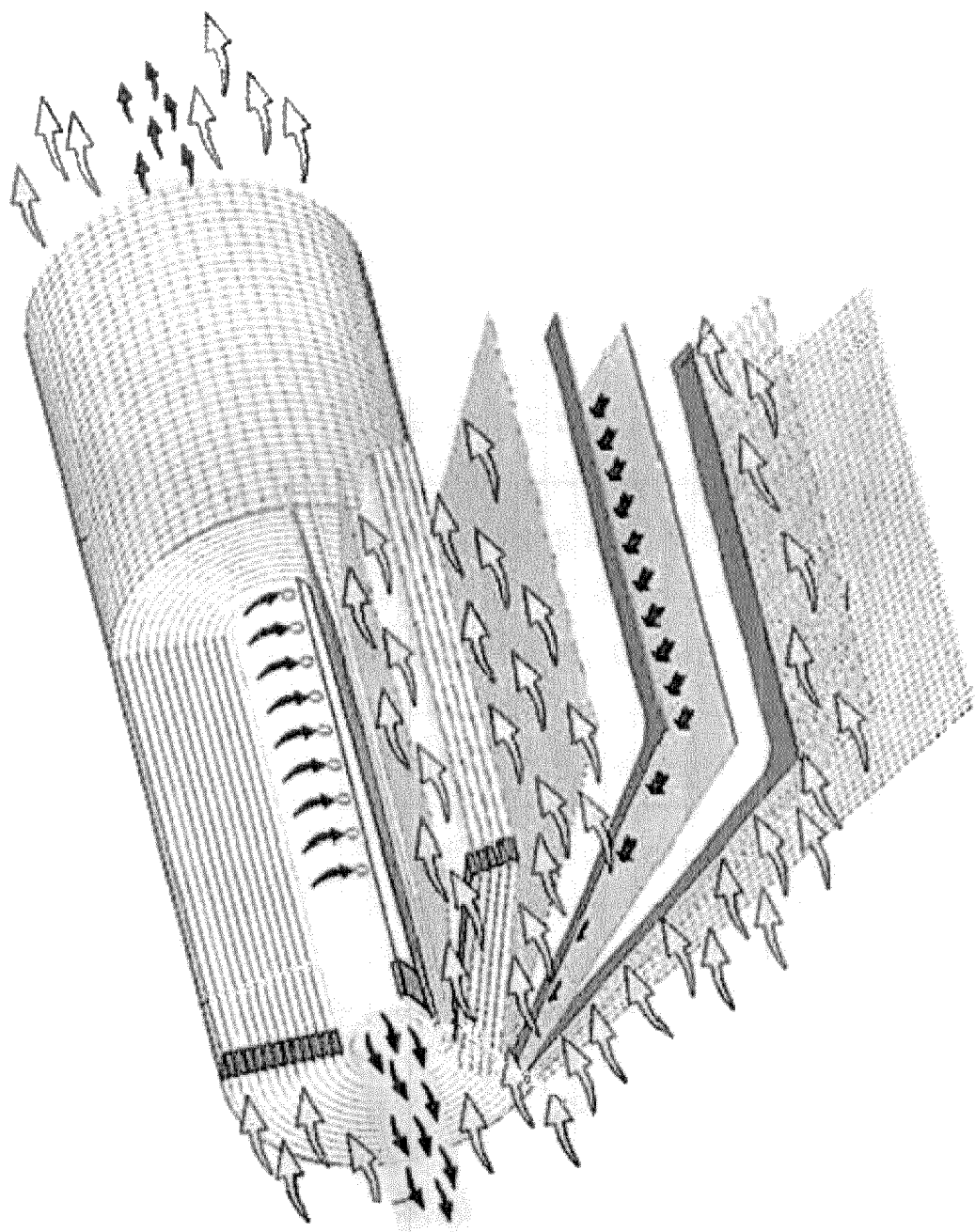
FIG. 1 is a schematic drawing of the construction and operation of an ultra filtration (UF) membrane with the permeate and retentate flows indicated.

Material that passes through a membrane is called "permeate"; material that does not pass through a membrane and is recirculated is called "retentate." If tea is refrigerated and "creaming"/sedimentation takes place, the two phases that form are called "sediment" and "supernatant" (the liquid phase above the sediment).

"Microfiltration" is filtration that uses a membrane having a pore size range from 0.1 to 10 µm and for which pressurization is optional. The microfiltration can use membranes that are hollow fibers, a flat sheet, tubular, spiral wound, hollow fine fibers or track etched, for example. The present disclosure is not limited to a specific embodiment of the microfilter.

"Ultrafiltration" is a membrane filtration technique using hydrostatic pressure to force a liquid through a semi-permeable membrane. Suspended solids and high molecular weight solutes are retained in ultrafiltration, while water and low molecular weight solutes cross the membrane. Ultrafiltration is used in industry and research to purify and concentrate solutions containing large molecular weight molecules ($10^3$-$10^6$ Da). Ultrafiltration allows an efficient and, at the same time, gentle separation of large molecular weight compounds. Any common type of ultrafiltration membrane may be used in the ultrafiltration, and suitable ultrafilters are commercially available, for example from Millipore Corp. and Desal Systems. Techniques by which ultrafiltration may be performed include flat, spiral, and hollow fiber techniques, for example. The ultrafiltration may be performed in various modes, such as dead-end, cross-flow and back-flush operating modes. The present disclosure is not limited to a specific embodiment of the ultrafiltration membrane, the ultrafiltration technique or the ultrafiltration mode.

"Reduced temperature fractionation" is a fractionation technique in which a liquid is subjected to a temperature of 10° C. or below to form a sediment and a supernatant. The supernatant can be removed from the sediment, for example by decanting or syphoning.

DEFINITIONS OF TERMS USED HEREIN

"Bitterness" is one of the five primary tastes: sweet, sour, bitter, salty, and umami. Taste involves the sensations produced through stimulation of the taste buds on the tongue and is only one part of flavor. The perceived flavor of a food involves, to a considerable extent, the sense of smell along with the taste sensations and is influenced by other senses as well.

"Astringency" is generally recognized as a feeling of puckering and dryness in the palate and is known to build in intensity and become increasingly difficult to clear from the mouth over repeated exposures. Astringency is a dry sensation experienced in the mouth and is commonly explained as arising from the loss of lubricity owing to the precipitation of proteins from the salivary film that coats and lubricates the oral cavity. Astringency is not confined to a particular region of the mouth but is a diffuse surface phenomenon, characterized by a loss of lubrication, which takes a time of the order of 15-20 seconds to develop fully. Therefore, astringency is quite different from the more well-known taste sensations.

Further in regard to the distinction between bitterness (a taste) and astringency (a flavor sensation), it is noteworthy that flavor is a blend of taste, smell and general touch sensations evoked by the presence of a substance in the mouth. Regarding taste, taste buds are found in small elevations, called papillae, on the surface of the tongue. Bitter substances in a solution contact taste receptors in the taste pore leading to the taste bud. A message is sent to the brain from the taste cells by way of nerve fibers with endings in the taste cells. The brain interprets and identifies the specific taste.

Regarding smell, the olfactory center is found at the top of the nasal cavity. To stimulate the olfactory center, substances must be in gaseous form. The gaseous molecules enter the nose as food is placed in the mouth and are drawn toward the olfactory center where they stimulate nerve endings to provide the smell aspect of flavor.

"Refreshing" is a complex term encompassing several aspects and experiences. Generally, certain aspects of a "refreshing" tea beverage are associated with several attributes such as beverage liking, health and wellness, authenticity, relaxation, renewal, revitalizing, purity, hydrating, thirst-quenching, gulpability or drinkability, mouth-watering, clarity, color, and coolness. However, certain tea sensory attributes go against refreshing, such as too sweet (sugary) with associated thicker body or viscosity, too much acidity (tartness), too mouth drying (astringency), too bitter, too much lingering aftertaste and lack of gulpability, and too strong tea character.

Texture is significant for the perception of refreshment. Refreshment is an emotional feeling, thus how the product feels in the mouth becomes an important part of the emotion. Textures found to be relevant to refreshment include carbonation (right amount), lightness (thin) and clean finish (no mouthcoat, no astringency) and may be as important as the flavor.

All percentages expressed herein are by weight of the total weight of the composition unless expressed otherwise. When reference is made to the pH, values correspond to pH measured at 25° C. with standard equipment.

As used in this disclosure and the appended claims, the singular forms "a," "an" and "the" include plural referents unless the context clearly dictates otherwise. As used herein, "about" is understood to refer to numbers in a range of numerals, such as within 5% of the referenced number or within 10% of the referenced number, for example. Moreover, all numerical ranges should be understood to include all integers, whole or fractions, within the range.

The compositions disclosed herein may lack any element that is not specifically disclosed. Thus, the disclosure of an embodiment using the term "comprising" includes a disclosure of an embodiment "consisting essentially of" and an embodiment "consisting of" the referenced components. Any embodiment disclosed herein can be combined with any other embodiment disclosed herein.

Preferred Embodiments

The present disclosure provides methods for increasing the clarity and modulating the bitterness, astringency and persistency of green tea and nutritional products having a green tea with reduced bitterness, astringency and persistency. The green tea produced according to the methods described herein has a reduced bitterness, astringency and persistency as compared to conventional green tea but still maintains a high antioxidant (e.g., flavanoid or flavan-3-ol or catechin) content.

In a general embodiment, the present disclosure provides a method for improving the clarity; reducing the bitterness, astringency and persistency; and increasing the refreshing attributes of a green tea product. The method comprises microfiltration of green tea extract. The microfiltration membrane preferably has a pore size of about 0.1 µm. Instead of microfiltration, another physical technology such as centrifugation may be used. However, microfiltration is preferred due to the level of clarity and removal of insoluble compounds that are achieved.

Preferably, the microfiltration removes all of the insoluble compounds from the green tea extract, and the microfiltration permeate is completely lacking in insoluble compounds. The microfiltration permeate preferably has a concentration of antioxidants at least equal to that of the green tea extract before microfiltration, more preferably about the same. Furthermore, the microfiltration permeate preferably has a concentration of caffeine at least equal to that of the green tea extract before microfiltration, more preferably about the same.

The microfiltration permeate can then be subjected to at least one of ultrafiltration or reduced temperature fractionation. The ultrafiltration membrane preferably has a MWCO of 5,000 to 50,000 Da; preferably 5,000 to 25,000 Da, such as 5,000 to 10,000 Da or 10,000 to 25,000 Da. In an embodiment, the ultrafiltration membrane has a MWCO of 5,000 Da, 10,000 Da or 22,000 Da. The reduced temperature fractionation is performed at 10° C. or below, preferably at 8° C. or below, more preferably at 6° C. or below, such as 2 to 6° C., even more preferably at 4° C. or below, and most preferably at −20° C. or below, such as at about −20° C. In an embodiment, the reduced temperature fractionation is performed for at least 12 hours, for example for 12-24 hours.

In an embodiment, both ultrafiltration and reduced temperature fractionation are performed. In such an embodiment, the method can comprise performing ultrafiltration on the microfiltration permeate to form an ultrafiltration retentate and an ultrafiltration permeate; and then performing reduced temperature fractionation at 10° C. or below on the ultrafiltration permeate to form a supernatant and a sediment.

Preferably the ultrafiltration permeate has a reduced level of flavonol-glycosides relative to the green tea extract before microfiltration, for example approximately 10% less, and has a concentration of antioxidants at least similar to that of the green tea extract before microfiltration, more preferably about the same (at the same solids content). Furthermore, the ultrafiltration permeate preferably has a concentration of caffeine at least equal to that of the green tea extract before microfiltration, more preferably about the same (at the same solids content).

In an embodiment, the reduced temperature fractionation can reduce the solids content of the microfiltration permeate by 5-15%. Preferably the reduced temperature fractionation supernatant has a reduced level of flavonol-glycosides relative to the green tea extract before microfiltration and has a concentration of antioxidants slightly less or about the same relative to that of the green tea extract before microfiltration, more preferably about the same (at the same solids content). Furthermore, the reduced temperature fractionation supernatant preferably has a concentration of caffeine slightly less or about the same relative to that of the green tea extract before microfiltration, more preferably about the same (at the same solids content).

The sediment from the reduced temperature fractionation can be used as a flavor modulator. For example, the sediment can be used as a natural flavorant to add flavor complexity to products other than tea, for example other beverages, ice cream, yogurt, fruit products or energy products.

The method can be employed commercially as part of a processing scheme to manufacture green tea powders for use in powder mixes and/or in beverages and concentrates. Additionally or alternatively, the supernatant may be used directly in liquid form as a concentrate or concentrated to a higher concentration.

The green tea subjected to microfiltration may be obtained prior to this operation by any method known in the art. For example, the green tea may be obtained by extraction of green tea leaves, such as aqueous extraction. As another example, the green tea may be obtained by reconstitution of green tea powder.

Microfiltration of the green tea extract at about 4% tea solids content removes all insoluble compounds and provides a MF permeate and a final supernatant that have very appealing appearances with brilliant clarity and bright yellow/green color compared to the standard product which is hazy/turbid/cloudy. Moreover, microfiltration of the green tea extract at about 4% tea solids content achieves a different taste profile relative to the standard Choladi green tea sensory profile and removes the strongly, sometime sharp green/grassy/bushy/shrubby/raw green flavors the permeate. The solids content can be adjusted to modulate the amount of sedimentation, for example based on the type of tea extract used (e.g., green or black).

The green tea used for the tests is a green tea extract at about 4% tea solids; however, the green tea extracts can have a solid content between 1 and 30% before microfiltration.

After the ultrafiltration and/or reduced temperature fractionation, the concentrated green tea extract can be spray-dried or freeze-dried using any suitable technique to produce a dried green tea product. The dried green tea product can be added to any suitable nutritional composition. The nutritional composition can be any suitable composition such as a pharmaceutical composition, a powdered beverage, a ready-to-drink beverage, a pet food composition, a food supplement, an infant formula, a confectionery, a chocolate product, a food product or a combination thereof. The nutritional composition may also include one or more of proteins, fats, carbohydrates and any other suitable ingredient.

In an embodiment, the concentrated green tea extract may be distributed as a concentrate (granulate, powder, syrup, etc.). The end user can then dilute the concentrate to produce a green tea beverage.

If necessary a further stabilization of the obtained green tea concentrate can be processed according to know methods.

Suitable dietary proteins can be animal proteins (such as milk proteins, meat proteins and egg proteins), vegetable proteins (such as soy protein, wheat protein, rice protein, and pea protein), mixtures of free amino acids or combinations thereof. Milk proteins such as casein and whey, and soy proteins are particularly preferred. As far as whey proteins are concerned, the protein source may be based on acid whey or sweet whey or mixtures thereof and may include alpha-lactalbumin and beta-lactoglobulin in whatever proportions are desired. The proteins may be intact or hydrolyzed or a mixture of intact and hydrolyzed proteins.

Fat sources include canola oil, corn oil, palm olein, high oleic sunflower oil and high oleic safflower oil. The essential fatty acids linoleic and α-linolenic acid may also be added as may small amounts of oils containing high quantities of preformed arachidonic acid and docosahexaenoic acid such as fish oils or microbial oils.

Any suitable carbohydrate may be used such as, for example, sucrose, lactose, glucose, fructose, corn syrup solids, saccharose, maltodextrins, starch and mixtures thereof. Dietary fiber may also be added if desired. Dietary fiber passes through the small intestine undigested by enzymes and functions as a natural bulking agent and laxative. Dietary fiber may be soluble or insoluble and in general a blend of the two types is preferred. Suitable sources of dietary fiber include soy, pea, oat, pectin, guar gum, gum Arabic, fructooligosaccharides and galacto-oligosaccharides.

The nutritional compositions containing the spray-dried or freeze-dried or concentrate green tea product can further include minerals and micronutrients such as trace elements and vitamins. Examples of minerals, vitamins and other micronutrients optionally present in the nutritional compositions include vitamin A, vitamin B1, vitamin B2, vitamin B6, vitamin B12, vitamin E, vitamin K, vitamin C, vitamin D, folic acid, inositol, niacin, biotin, pantothenic acid, choline, calcium, phosphorous, iodine, iron, magnesium, copper, zinc, manganese, chloride, potassium, sodium, selenium, chromium, molybdenum, taurine, and L-carnitine. Minerals are usually added in salt form.

The nutritional compositions containing the spray-dried or freeze-dried or concentrate green tea product can include one or more food grade emulsifiers such as, for example, diacetyl tartaric acid esters of mono- and di-glycerides, lecithin and mono- and di-glycerides. Similarly suitable salts and stabilizers may be included.

Alternatively, a ready-to-drink beverage product can be made directly from the concentrated green tea extract. The ready-to-drink beverage products can include any suitable flavors. Such flavors can include fruit flavors, mocha, chocolate, chai, caramel, vanilla or a combination thereof.

The ready-to-drink beverage products can include one or more stabilizers, vitamins and/or minerals. Examples of stabilizers include gelatins, starches, gums, emulsifying agents, buffers, carbonates and the like. Examples of minerals, vitamins and other micronutrients optionally present in the nutritional compositions include vitamin A, vitamin B1, vitamin B2, vitamin B6, vitamin B12, vitamin E, vitamin K, vitamin C, vitamin D, folic acid, inositol, niacin, biotin, pantothenic acid, choline, calcium, phosphorous, iodine, iron, magnesium, copper, zinc, manganese, chloride, potassium, sodium, selenium, chromium, molybdenum, taurine, and L-carnitine.

The green tea produced by the methods according to the invention can particularly be used in the composition of a concentrate for preparing acidified milk based beverages by dilution, said concentrate comprising:

from 2 to 10 weight % of denatured milk proteins expressed as solid-non-fat (SNF) milk components, from 15 to 80 weight %, expressed as sugar equivalents, of a carbohydrate based and/or non-carbohydrate based sweetener, from 0.35 to 1.50 weight % of a carbohydrate based stabilizer, an acidifying agent present in amounts necessary for achieving a pH of 3.0 to 3.8 of the said concentrate composition, from 0.10 to 5.30 weight %, preferably from 0.15 to 3.51 weight %, even more preferably from 0.18 to 2.63 weight %, of green tea solids according to the present invention.

The denatured milk proteins are preferably milk proteins that have been subjected to heat treatment, that is presenting whey protein nitrogen index below 1.5 mg N/g. This whey protein nitrogen index (WPNI) refers to the amount of still denaturable serum protein left in the powder after heat treatment as described in literature, especially in "Walstra, P., J. T. M. Wouters, T. J. Geurts, Dairy Science and Technology, Second ed., Boca Raton: CRC Taylor & Francis", page 530.

The carbohydrate-based sweetener is usually a mono- or polysaccharide selected from the group consisting of sugars, sugar substitutes, sugar derivatives and mixtures of same.

The carbohydrate-based stabilizer is usually a polysaccharide selected from the group consisting of gums, pectins and pectin derivatives, cellulose derivatives, carrageenan and carrageenan derivatives and mixtures of same.

The acidifying agent is preferably a comestible acid or a source of comestible acid, e.g. fruit juice, like citric acid.

The green tea solids is preferably a green tea powder issued from spray drying, freeze drying or comes from a green tea concentrate according to one of the methods described above.

The concentrate composition for preparing acidified milk based beverages can further comprise fats, colorants, flavours or micronutrients.

Such a concentrate can be prepared according to the process described in WO 2007/144333, or preferably by:
- mixing the source of denatured milk proteins with a carbohydrate based or non-carbohydrate based sweetener and with the carbohydrate based stabilizer,
- bringing the above mixture to a pH of about 3.0 to about 3.8 while mixing it with the acidifying agent, and
- adding and mixing the green tea powder with the above mixture,
- sterilizing or pasteurising the above acidified mixture and subsequently pouring it into containers.

The concentrate is used to prepare acidified milk based beverages, by diluting one part of the concentrate with 2 to 7 parts of water.

Preferably the dilution is realized so that the acidified milk based beverage presents from 0.02 to 0.98 weight %, preferably from 0.03 to 0.65 weight %, even more preferably from 0.03 to 0.49 weight %, of green tea solids. Such a dilution enables the preparation of a cup of green tea beverage comprising the same amount of tea solids as a beverage prepared by extraction of a green tea leaf bag with water, in particular the same amount of flavonoid antioxidants.

As an example, the concentrate enables the preparation of a 285 ml serving cup of green tea beverage equivalent to a cup of green tea made by full water extraction of a 2.2 g green tea leaf bag, which represents about 770 mg tea solids and about 170 to 240 mg of flavonoid antioxidants.

The dilution is preferably implemented by means of a beverage-dispensing machine. The machine usually comprises a pump for pumping the concentrate and mixing the pumped concentrate with a dose of water. Preferably the concentrate is kept refrigerated inside the machine.

Examples

By way of example and not limitation, the following examples are illustrative of various embodiments of the present disclosure.

The research in these examples were performed in three phases: (1) bench-top membrane screening utilizing flat-sheet membranes with different molecular weight cut-offs (MWCO); (2) co-pilot plant or mid-scale lab (CPP) microfiltration (MF) and ultra filtration (UF) using 22,000 and 10,000 MWCO spiral membranes; and (3) a bench-top study of reduced temperature fractionation (RTF) at frozen temperatures (−20° C.) and refrigeration temperatures (4 and 8° C.).

The objectives were the following: (1) determine if microfiltration and/or MWCO membranes fractionate high polyphenol content green tea to obtain fractions with reduced bitterness and astringency (B&A) by targeting removal of larger molecular weight (MW) molecules, such as the flavonol-glycosides that have been identified in the literature as astringent; (2) identify other potential product advantages, such as high clarity, high antioxidant level, enhanced color attributes, enhanced and/or unique flavor attributes; and (3) determine the applicability of the tested processes to consumer benefits, such as pleasure (increased sensory characteristics such as refreshment by reducing negative characteristics such as B&A; reduction of added sweeteners; and resultant premium nutritional products); natural ingredients; and protection (maintain high antioxidant (AOX) content).

Flavonol-glycosides that have been identified in the literature as astringent—See Scharbert S., N. Holzmann and T. Hofmann. 2004. Identification of the Astringent Taste Compounds in Black Tea Infusions by Combining Instrumental Analysis and Human Bioresponse. J. Agric. Food Chem., 52, 3498-3508 and Scharbert S. and T. Hofmann. 2005. Molecular Definition of Black Tea Taste by Means of Quantitative Studies, Taste Reconstitution, and Omission Experiments. J. Agric. Food Chem., 53, 5377-5384.

Experimental

Bench-Top Membrane Screening

Bitter and astringent compounds present in high quality tea extract may be fractionated from other tea compounds based on MWCO using UF membranes. To test this hypothesis, a series of bench-top screening trials were conducted on various types of UF membranes to identify the best membrane for fractionation. The following table identifies the 18"×18" flat sheet membranes by Koch Membrane Systems used in this bench scale study.

TABLE 1

Membranes

| Membrane No. | Product Name | MWCO |
|---|---|---|
| 1 | TFC-SR100 | 200 (standard) |
| 2 | MPF-34 | 200 (acid/base stable) |
| 3 | MPF-36 | 1,000 (acid/base stable) |
| 4 | HFK-328 | 5,000 |
| 5 | HFK-131 | 10,000 |
| 6 | MPF-U20P | 25,000 (acid/base stable) |
| 7 | M100 | 50,000 (regular) |
| 8 | M116 | 50,000 (high temperature) |
| 9 | M180 | 100,000 (high temperature) |
| 10 | M183 | 100,000 (positive) |
| 11 | P707 | 120,000 (negative) |
| 12 | K618 | 1 µm (microfiltration) |

Flat sheet membranes were hand cut to size and loaded into the cells, tightened and system pressurized, and run at 10 bar. Tea liquor was prepared for bench testing by dissolving high quality commercial green tea powder from Choladi, India in hot reverse osmosis (RO) water to about 8% tea solids content (Tc) with continuous stirring to achieve full solubility and then diluting the solution to 2% Tc using room temperature (RT) RO water.

Co-Pilot MF and UF Membrane Process

Based on the bench-top membrane trials, a larger scale membrane unit by GEA Process Engineering Inc. was used in a co-pilot plant to fractionate commercial Choladi high quality green tea liquor as described hereafter.

MF at 0.1 µm was used to remove haze and suspended insoluble solids prior to UF treatment. UF membranes were used to fractionate MF permeate on a molecular level in an effort to reduce B&A compounds, such as flavonol-glycosides. A high quality commercial green tea powder from Choladi, India that provides the highest levels of antioxidants and flavor characteristics available in a premium green tea powder was reconstituted at 4% Tc to simulate the extract normally present during extraction of the tealeaf.

The tea liquor was processed in the CPP as follows:

1. Reconstitute green tea powder in an enclosed Lanco mixer using RO water at about 70° C. with stirring to ensure proper dissolution. Keep a sample of the reconstituted green tea (MF Feed) for analysis by collecting and freeze drying the sample.
2. MF (0.1 μm) to give a "high clarity" permeate and a hazy/cloudy retentate for evaluation and analysis. MF was performed with a feed tank held at about 50° C. and a large scale MF membrane unit, and the retentate was recycled back into the feed tank. A ratio of 80:20 permeate: retentate was planned.
3. UF with 10,000 MWCO to fractionate MF permeate based on molecular weight. UF was performed with a feed tank held at about 50° C. and a large scale UF membrane unit, and the retentate was recycled back into the feed tank. A ratio of 50:50 permeate and retentate was planned.
4. MF and UF permeates and retentates were freeze dried (FD) for further testing and concept development.
5. Release powders for tastings after quality assurance release.

A batch mixer from Lanco GmbH was used. The mixer had a fifty gallon stainless steel mixing vessel mounted on scales for weight measurement of ingredients, a reverse osmosis water supply, and a bottom mounted sheer mixer with speed control. The mixer was steam jacketed with temperature control and nitrogen blanketed with a top sealing door for headspace oxygen reduction.

A multifunctional membrane unit (model R) by GEA Process Engineering Inc. was configured for microfiltration (MF) utilizing a Graver stainless steel membrane (0.7 m² area) with an effective 0.1 μm filtration cutoff. This level of filtration was expected to remove all the "haze" and fine insoluble materials in the green tea, providing a high clarity permeate. The unit was operated using a "batch" technique. Permeate was collected separately while the retentate was recycled back to the feed tank. The batch operation continued until about 75 to 80% of the feed material had been collected as permeate (ratio of 80:20). The membrane flux rate was recorded periodically throughout the trial to determine fouling tendency over time. All trials were conducted at approximately 40 to 50° C. to prevent any "normal" creaming of the tea solids. Weights of the feed permeate and retentate were recorded to allow mass balance calculations. Samples of the feed permeate and retentate were collected and analyzed for both chemical and sensory changes. The MF permeate was retained for further processing by UF.

A multifunctional membrane unit (model R) by GEA Process Engineering Inc. was reconfigured for ultra filtration (UF) processing and installed with a pair of 10,000 MWCO Koch spiral membranes (#3838-K131-NYV, 5.5 m² each) and again operated using a "batch" technique. UF permeate was collected separately while the retentate was recycled back to the feed tank and continued until about 50% of the feed material had been collected as permeate. Membrane flux rate was recorded periodically (every thirty minutes) throughout the trial to determine fouling tendency over time. The trial was conducted at about 40 to 50° C. to prevent any normal "creaming" of the tea solids. Weights of the feed, permeate and retentate were recorded to allow mass balance calculations. The UF permeate and the retentate were sampled and tested for potential fractionation of the tea compounds (i.e. antioxidants, bitterness, astringency) as well as changes in other visual and flavor attributes.

FIG. 1 is a schematic drawing of the construction and operation of an ultra filtration (UF) membrane with the permeate and retentate flows indicated. The permeate tube is indicated in the middle of the structure.

Bench-Top Study of Reduced Temperature Fractionation (RTF)

A study was performed to evaluate whether the formation of a heavy "tar-like" sediment upon freeze-thawing or prolonged cooling affects B&A of tea extracts. Upon careful thawing, the tea extracts were separated into supernatant and sediment.

Bench-top tests were performed at temperatures below 10° C. (−20, 4 and 8° C.) to induce "creaming" (sedimentation) in high clarity MF and UF permeates, as well as UF retentate produced in the co-pilot lab plant trials described above. The objective was to determine the feasibility of fractionating through "creaming" (sedimentation) to remove important B&A tea compounds to produce a smoother tasting refreshing tea that is still high in AOX.

MF permeate was divided into portions which were each cooled at different temperatures, namely above freezing (4° C. and 8° C.) and below freezing (−20° C.). The tests were done with fractions in one gallon jugs and maintained at the mentioned temperatures for at least twelve hours. The frozen jug was allowed to slowly thaw in the refrigerator and then all three portions were carefully decanted on the bench. Supernatant and the concentrated sediment fractions from each jug were collected separately. Each supernatant fraction was weighed and sampled for the amount of solids (Tc) to allow mass balance calculations. The remaining sediment fraction in each jug was re-dissolved in a known amount of hot RO water, weighed, and sampled for the Tc. Again, the weight and the Tc would be used to allow a mass balance calculation for any fractionated compounds. Visual observations of each fraction were noted. Samples were diluted to normal drinking strength (0.2% Tc) for additional visual and sensory evaluation.

Samples were taken of all fractions produced, and the samples were placed in 40 ml amber vials. Sampling was divided into two vials, one for Tc measurements that was refrigerated and one for HPLC and total polyphenols that was frozen. The latter sampling was done to safely keep samples for longer periods of time without oxidation or deterioration. Before samples could be used for analyses they were carefully thawed and heated in a microwave in short bursts with careful shaking, checking and feeling heat generated in-between microwaving. The final temperature was around 70° C. for both the refrigerated sample and the frozen sample in order for sticky sediment/oil/tar to be completely re-dissolved before actual samples are taken for Tc, HPLC and total polyphenols analyses.

Analytical

High performance liquid chromatography (HPLC) was performed to determine amounts of catechins and caffeine. The following key catechins (flavan-3-ols) were quantitated: epigallocatechin-gallate (EGCG), epigallocatechin (EGC), epicatechin-gallate (ECG) and epicatechin (EC). Their epimers were also quantitated as minor tea components: gallocatechin (GC), catechin, gallocatechin-gallate (GCG) and catechin-gallate (CG). Gallic acid (GA) and caffeine were also quantitated.

Flavonol-glycosides were detected at 380 nm, and the profile was quantitated by peak areas. Theaflavins were detected at 460 nm. Caffeine was run as an external standard, and concentrations of individual catechins were calculated.

Total polyphenols were quantitated by the Folin Ciocalteu (FC) method. To determine tea solids content (Tc), samples were carefully heated with a microwave to about 70° C. to dissolve the tar-like "cream" sediment that formed with MF and UF tea liquids and then analyzed with the Mojonnier method (evaporate sample in a dish on hotplate at 185° C. for 30 min followed by vacuum oven at 100° C. for 30 min.

Results

Bench-Top Membrane Screening

A selection of flat sheet UF membranes with different MWCO values from 500 to 120,000 were tested with the popular and high catechin content commercial Choladi green tea powder to investigate compositional behavior. HPLC results of the catechins, gallic acid and caffeine for permeate (top) and retentate (bottom) are shown in FIGS. 2A and 2B as percent on dry basis. The tea feed for all benchwork studies was at about 2% Tc.

For catechins and caffeine in the UF permeate, a side-by-side comparison of Choladi feeds used for bench-top and CPP trials (samples 49207.01 and 51486.16 respectively) and MF permeate (sample 51486.14) showed little compositional difference (FIGS. 2A and 2B).

Membranes at MWCO of 500 and 1,000 were so "tight" that no typical intrinsic tea compounds passed through the membranes in permeate. The application of this information for tea is that MWCO 500 and 1,000 membranes may be used for concentration purposes (as for RO applications). As shown by the Tc and ° B densitometry measurements in FIGS. 2A and 2B, almost no solids passed through these membranes. This observation is important if a temperature sensitive application concentration needs to be performed, in particular for a high quality tea.

Generally for all of the membranes from MWCO 5,000 to 120,000, there was an increase in total catechins from about 32% in the feed material to 37 to 44% in the UF permeate. For 5,000, 10,000, 25,000 and 50,000 MWCO membranes, total catechin content increased to 44, 42, 40, 39 and 40%, respectively.

Certain catechins and caffeine selectively increased in concentration in the UF permeate. EGC increased from 8% to 16 and 14% for 5,000 and 10,000 MWCO, respectively; EC increased from 2% to about 5%; GC also almost doubled from 1.5% to 3%; and caffeine increased from about 6% to about 9%. ECG concentrations remained fairly constant.

For catechins and caffeine in the UF retentate, only minor changes were observed in the caffeine and catechin composition for all of the membranes tested.

The most dramatic effect of UF was on the flavonol-glycosides as shown in FIGS. 3A and 3B. As for the catechins and caffeine with MWCO 500 and 1,000, none of the flavonol-glycosides passed through the membranes as they were too tight and rather acted as RO membranes. In order, MWCO membranes 5,000>>10,000>>25,000 were effective in lowering all flavonol-glycosides. Although some lowering was also seen with 50,000 MWCO, almost no reduction was observed at 100,000 and 120,000 MWCO.

The greatest increases in flavonol-glycosides in retentates were seen with the 10,000 and 25,000 membranes. This result is very much in line with the findings with the permeates where these compounds were removed. These findings also indicate that flavonol-glycosides can be selectively removed by UF.

Figure 4:
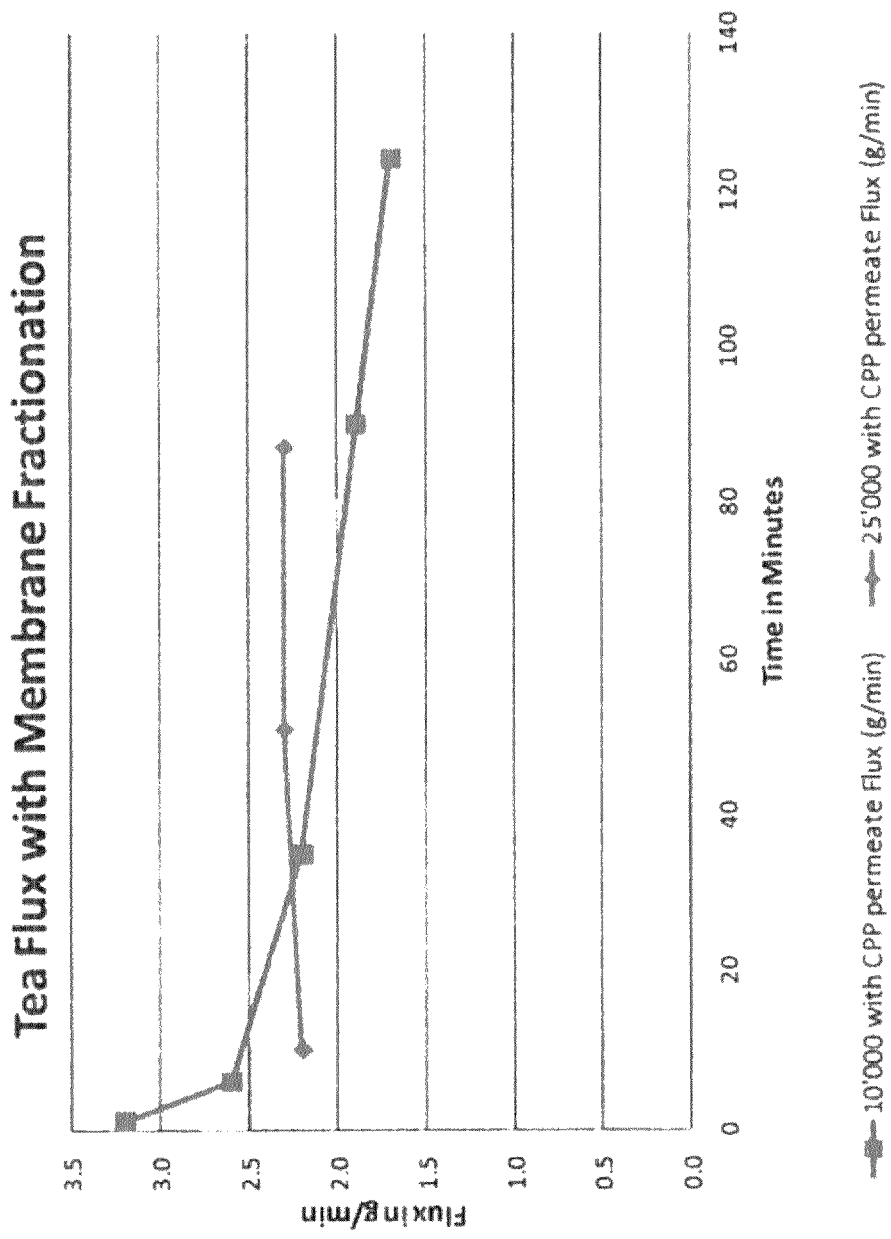
FIG. 4 is a graph of tea flux with 25,000 and 10,000 flat sheet membranes using MF permeate from the CPP at 2.0% tea solids content.

Based on these findings, a larger scale in the co-pilot plant (CPP) was pursued using a combination of MF (to clean up the Choladi extract and remove all haze and insoluble compounds that can contribute to fouling of the UF) and then use the MF permeate as feed for UF. MF was performed with a 0.1 µm stainless steel sintered filter. UF 10,000 MWCO spiral membranes were used. A comparison was made between the bench-top and the CPP analytical results for compositional changes and differences. Flux was anticipated to be higher with the 22,000 MWCO membranes (see FIGS. 4 and 5). The 10,000 MWCO membranes had much lower flux.

Co-Pilot Plant (CPP) MF Membrane Process

Figure 7:
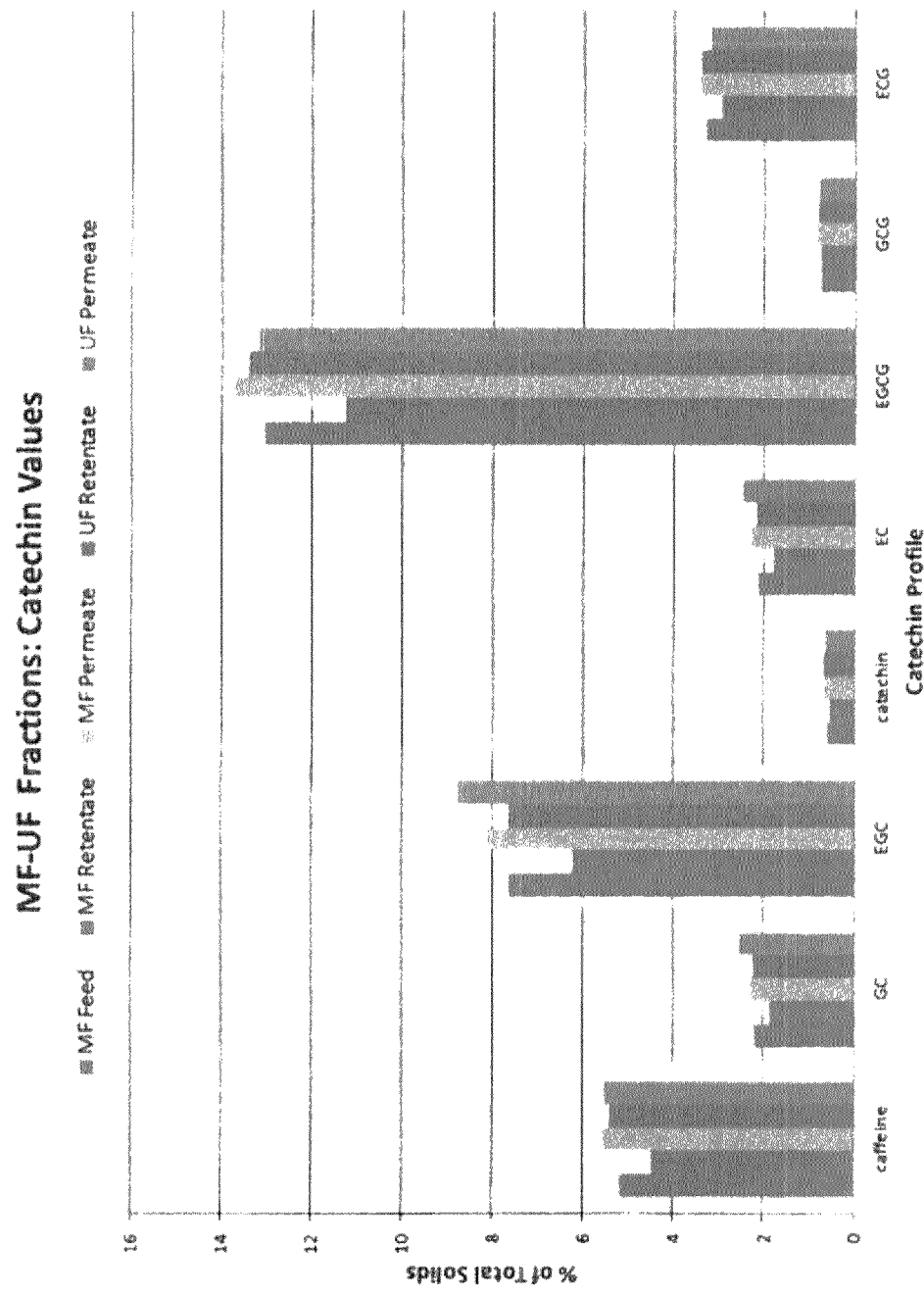
FIG. 7 is a graph showing a side-by-side comparison of the catechin and caffeine composition on a percent solids basis of microfiltration (MF) feed (reconstituted Choladi TGFT green tea powder, MF retentate, MF permeate, ultra filtration (UF) retentate and UF permeate.

Commercial Choladi green tea powder was reconstituted at 4% tea solids (Tc) content and used as the feed for microfiltration (MF) through a 0.1 µm sintered stainless steel filter. This liquid fraction is termed "MF Feed" and is the starting material. Catechin and caffeine compositional changes by HPLC of the different fractions are shown in side-by-side comparison results of the different liquid fractions on a percent solids basis (FIGS. 6 and 7).

Compared to the MF feed, the MF retentate was consistently lower and MF permeate higher in overall catechin and caffeine composition. For analytical methods, all dilutions were made at 0.20% solids content based on the total solids (soluble plus insoluble) content. The consistently lower values of compounds in the MF retentate (see FIGS. 6 and 7) is due to the calculation on a dry basis (db) which measures the total solids content, soluble plus insoluble materials. The insoluble materials increased by being concentrated in MF retentate (Tc=4.86%), so this recalculation to 0.20% solids basis resulted in this apparent decrease, because HPLC only measures soluble solids. For the same reason, MF permeate had less insoluble compounds and haze (Tc=3.59) than the MF Feed (Tc=3.90) and therefore with the calculation from total solids to 0.20% solids this came out slightly higher than the feed (see FIGS. 6 and 7). Although significant sensory changes were observed by the MF treatment, no observable fractionation took place on a molecular level for catechins and caffeine profiles as well as flavonol-glycosides. Although densitometry gave quick results for sensory evaluations, the official results for total solids determination were used for analytical dilutions. Results by both solids measurement methods are included in the data tables.

Figure 8:
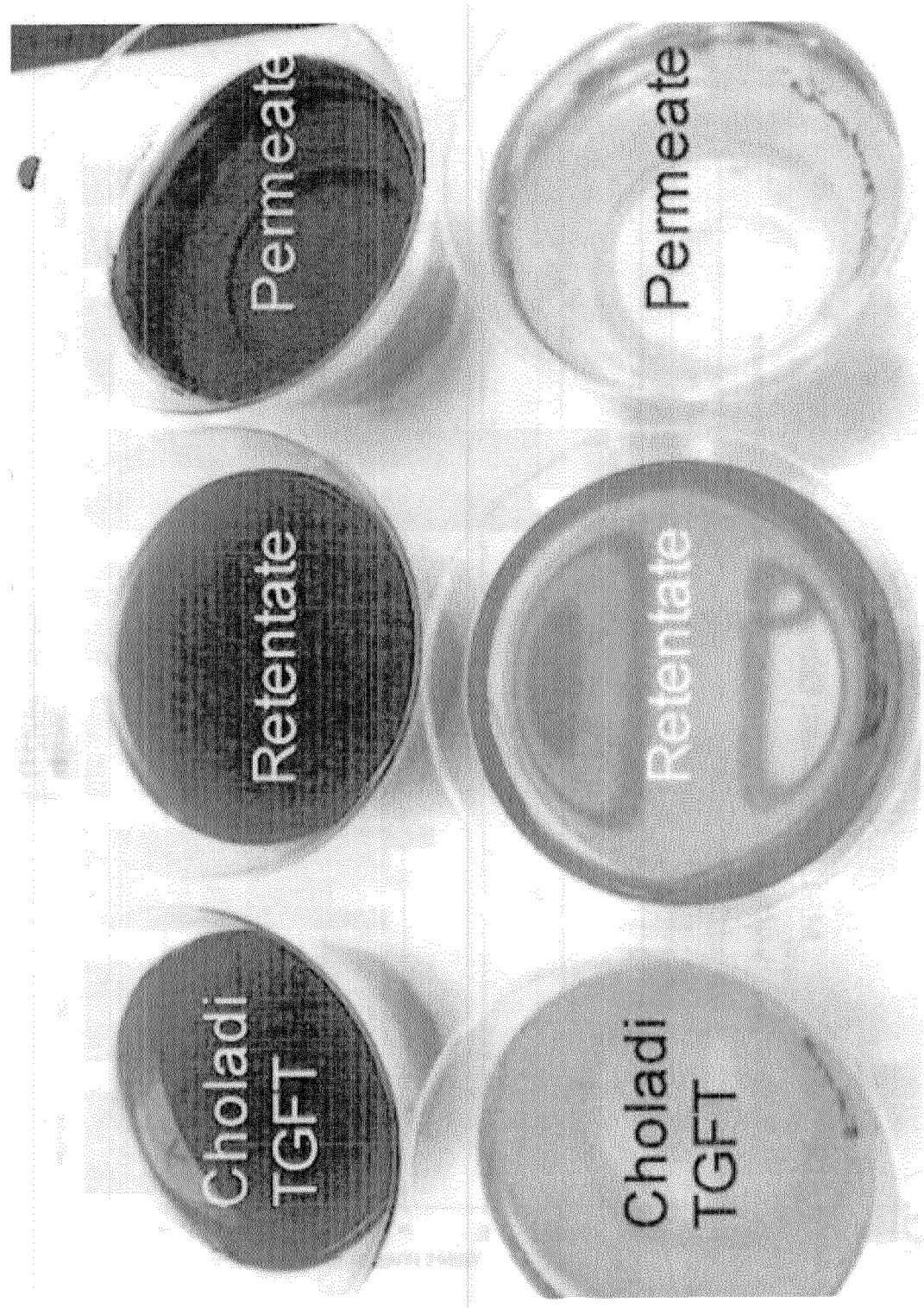
FIG. 8 is a photograph of a side-by-side comparison of MF feed (reconstituted TGFT Choladi green tea powder), MF retentate and permeate as concentrates at about 4% Tc (back) and as corresponding drinking strength at 0.2% Tc (front).

Visual & Sensory Results after Microfiltration (MF) Treatment: MF of green tea liquor feed yielded very interesting visual differences between the permeate and retentate (see FIG. 8). The 0.1 µm MF filter removed the fine haze and all insoluble compounds and provided a very high clarity permeate. Unexpectedly, the color of the two streams was very different. The retentate was very "green" in color (chlorophyll-type green) and also retained much of the green flavor characteristics of the feed material. The concentrated permeate (about 4% Tc) was dark "brown", turning to a distinct bright "yellowish" appealing color when diluted to drinking strength (see FIG. 8). From a sensory perspective, the MF permeate had much less green character but was flavorful and with good tea balance. MF retentate was very cloudy and contained all the insoluble compounds removed from the permeate.

Sensory and appearance tests were performed, leading to interest for several specific fractions. Specifically, sensory and appearance characteristics suggested further investigation for MF retentate and MF permeate; supernatant from reduced temperature fractionation of MF permeate; UF retentate and UF permeate; supernatant from reduced temperature fractionation of UF permeate; and supernatant from reduced temperature fractionation of UF retentate. Based on these sensory and appearance tests, sediment from reduced temperature fractionation of MF permeate; sediment from reduced temperature fractionation of UF permeate; and sediment from reduced temperature fractionation of UF retentate were not pursued further.

Sensory characteristics of MF retentate were strongly green (grassy/bushy/shrubby/leafy) with noticeably more B&A, harshness and raw character. MF retentate appears to be significantly lower in catechins and caffeine compared to the feed and permeate; however, this is not the case. The concentration of haze and other insoluble compounds contribute to the total solids content, which then affects dilutions made based on that number, which include both soluble and insoluble materials. By HPLC, only the soluble compounds are determined, which then result in apparently lower values.

Figure 14:
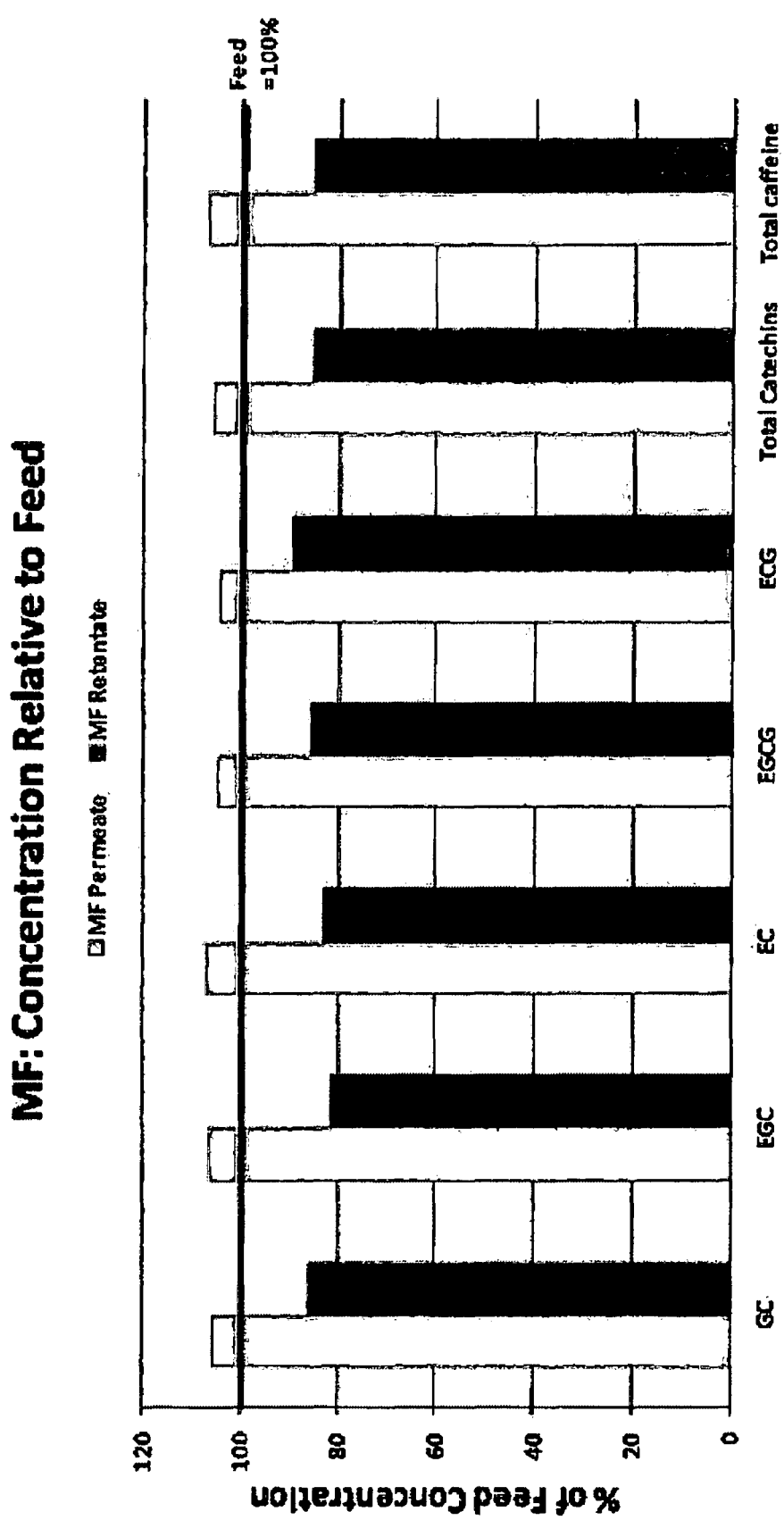
FIG. 14 is a graph showing a side-by-side comparison of catechins and caffeine in MF permeate and retentate relative to the feed material.
Figure 15:
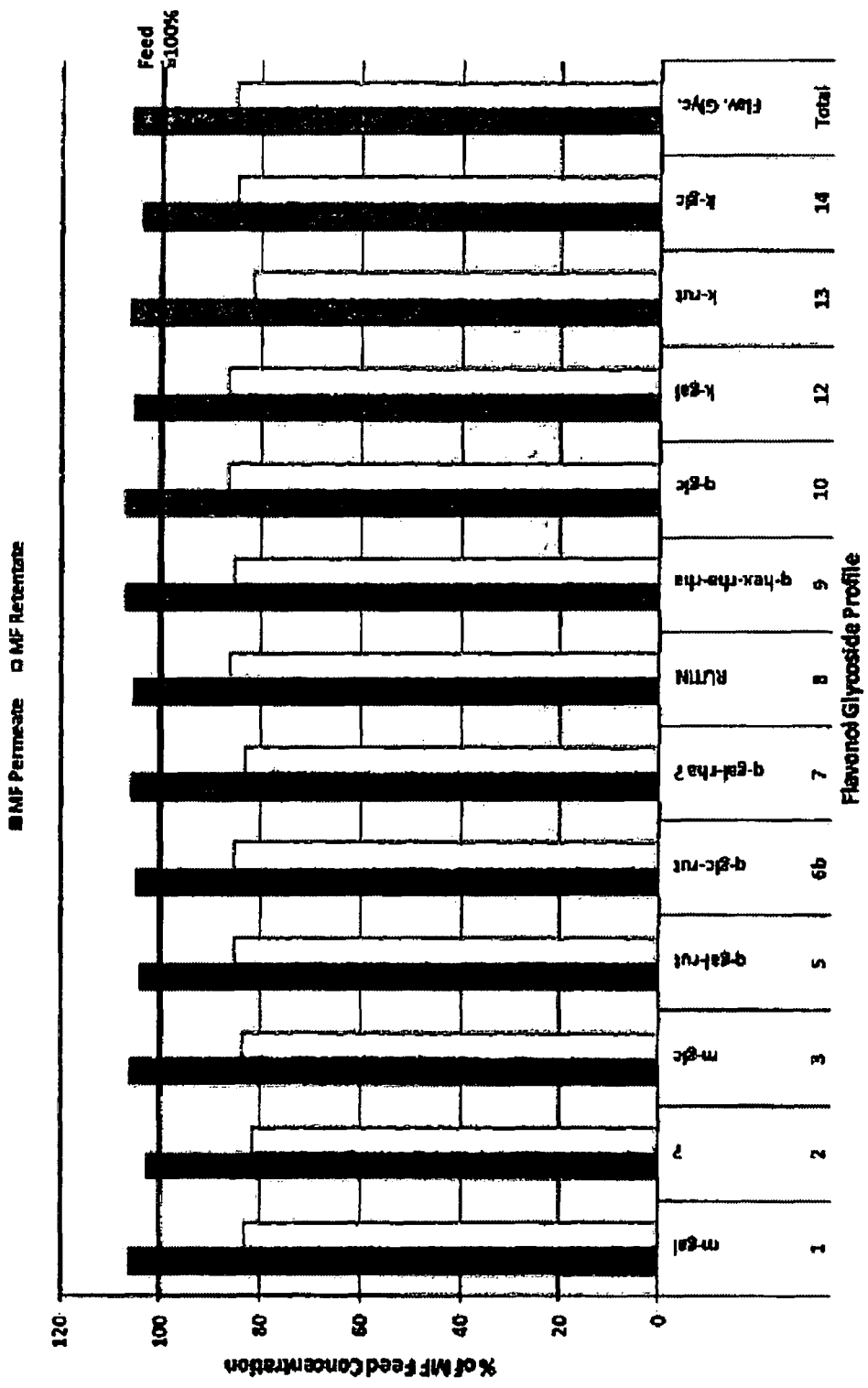
FIG. 15 is a graph showing a side-by-side comparison of flavonol-glycosides in MF permeate and retentate relative to the feed material.

The level of catechins and flavonol-glycosides in samples of the MF feed, permeate and retentate were analyzed by HPLC. Compared to the feed results, these results indicate the permeate was generally 5 to 15% higher in both classes of compounds, while the retentate was 10 to 20% lower (see FIGS. 9, 14 and 15).

Co-Pilot Plant (CPP) UF Membrane Process

MF was not anticipated to give fractionation on a molecular level, but the question remained if UF could bring about fractionation on a molecular level that could a value added product with unique catechin composition or sensory characteristics.

Figure 10:
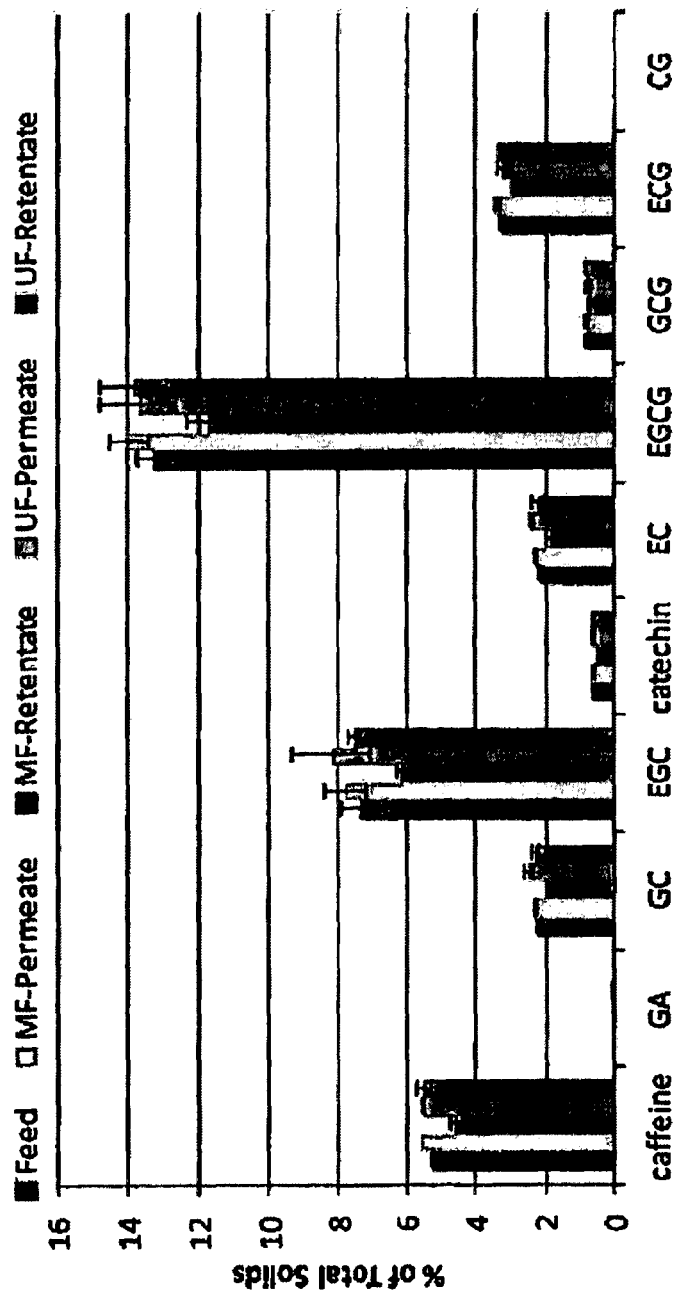
FIG. 10 is a graph showing the processing effect on caffeine and catechins content of Choladi feed, MF permeate and retentate and UF 10,000 and 25,000 MWCO treatments and permeate and retentate. CI's were calculated at 95%.
Figure 11:
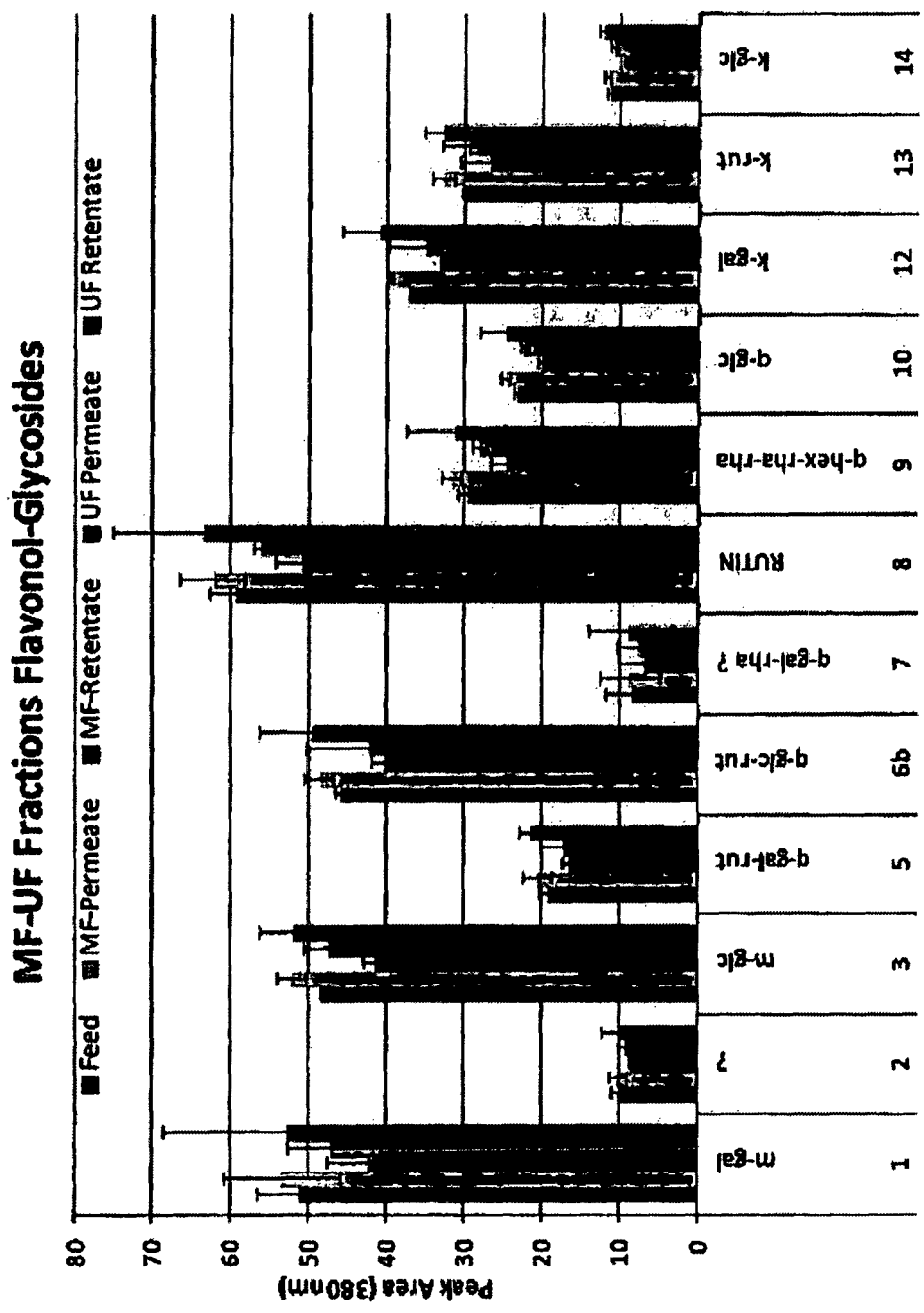
FIG. 11 is a graph showing the processing effect on flavonol-glycoside content of Choladi feed, MF permeate and retentate and UF 10,000 and 25,000 MWCO treatments and permeate and retentate. CI's were calculated at 95%.
Figure 12:
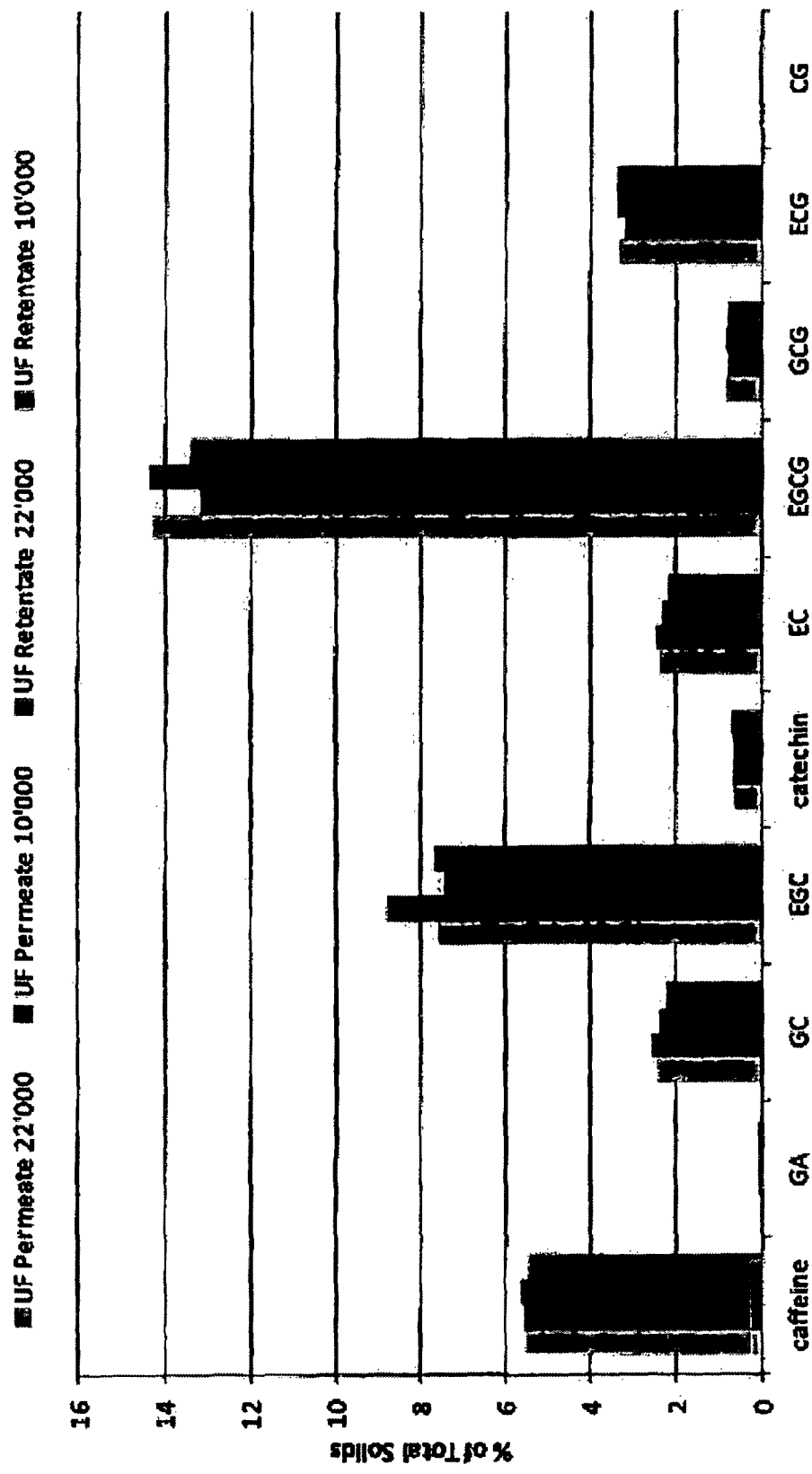
FIG. 12 is a graph showing the processing effect of UF membranes at 22,000 and 10,000 MWCO on catechins and caffeine permeate and retentate.
Figure 13:
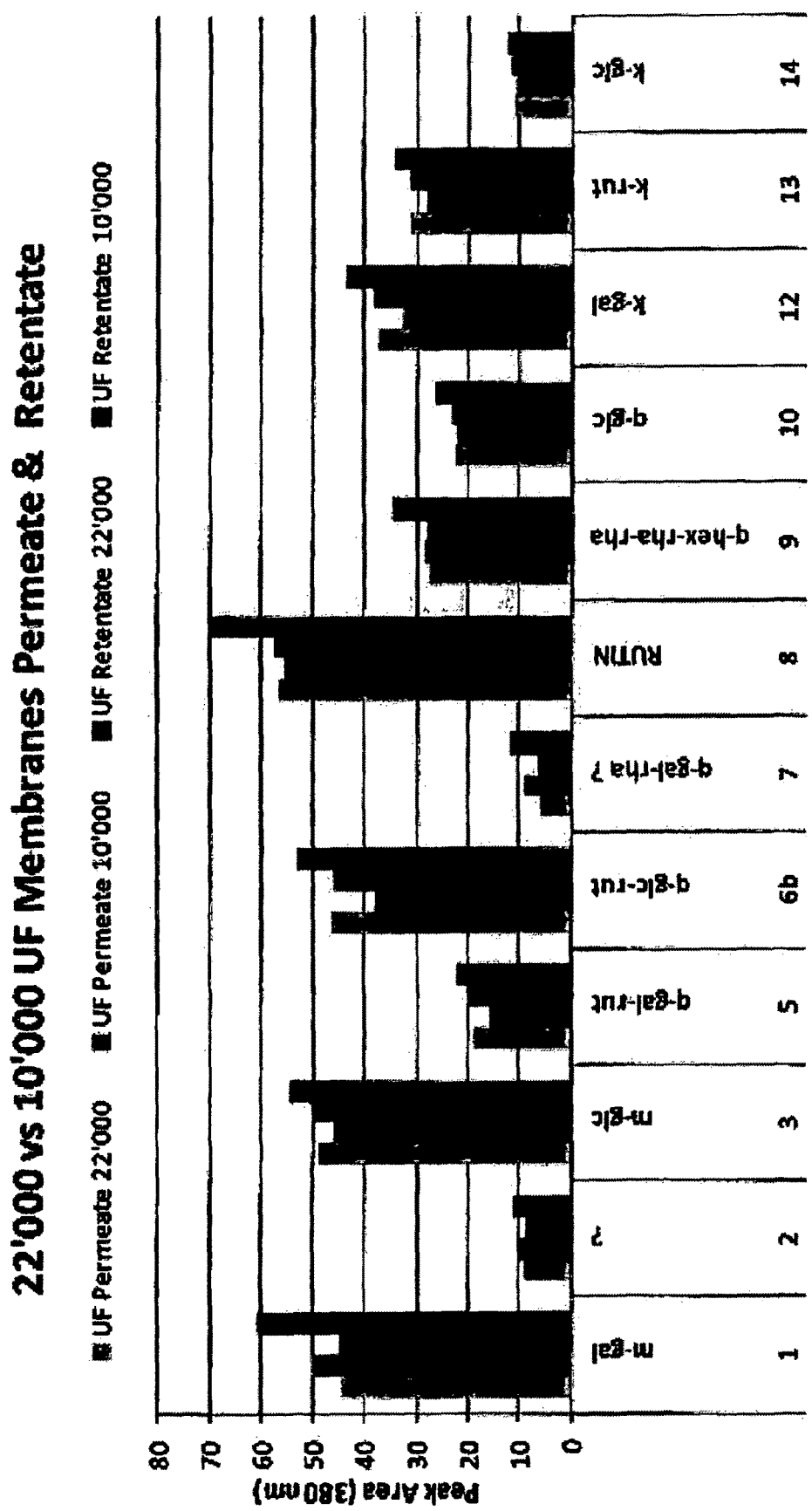
FIG. 13 is a graph showing the processing effect of UF membranes at 22,000 and 10,000 MWCO on flavonol-glycosides in permeate and retentate.

MF permeate was the feed used for UF to have a "clean" feed to slow fouling of the membranes. UF was performed with 22,000 and 10,000 MWCO membranes (FIGS. 12 and 13). Side-by-side comparisons are presented in FIGS. 10 and 11. Averages of two CPP trials several weeks apart were calculated with standard deviation and confidence intervals (CI) at 95% for Choladi feed (reconstituted TGFT powder at 4%), MF and UF permeates and retentate for caffeine, catechins and flavonol-glycosides. Most catechins and caffeine had coefficients of variation (CV) of 0.1 to 5% which show good reproducibility between the two trials. EGC and EGCG had larger variations of about 20% in the feed and about 40% in UF fractions.

Figure 16:
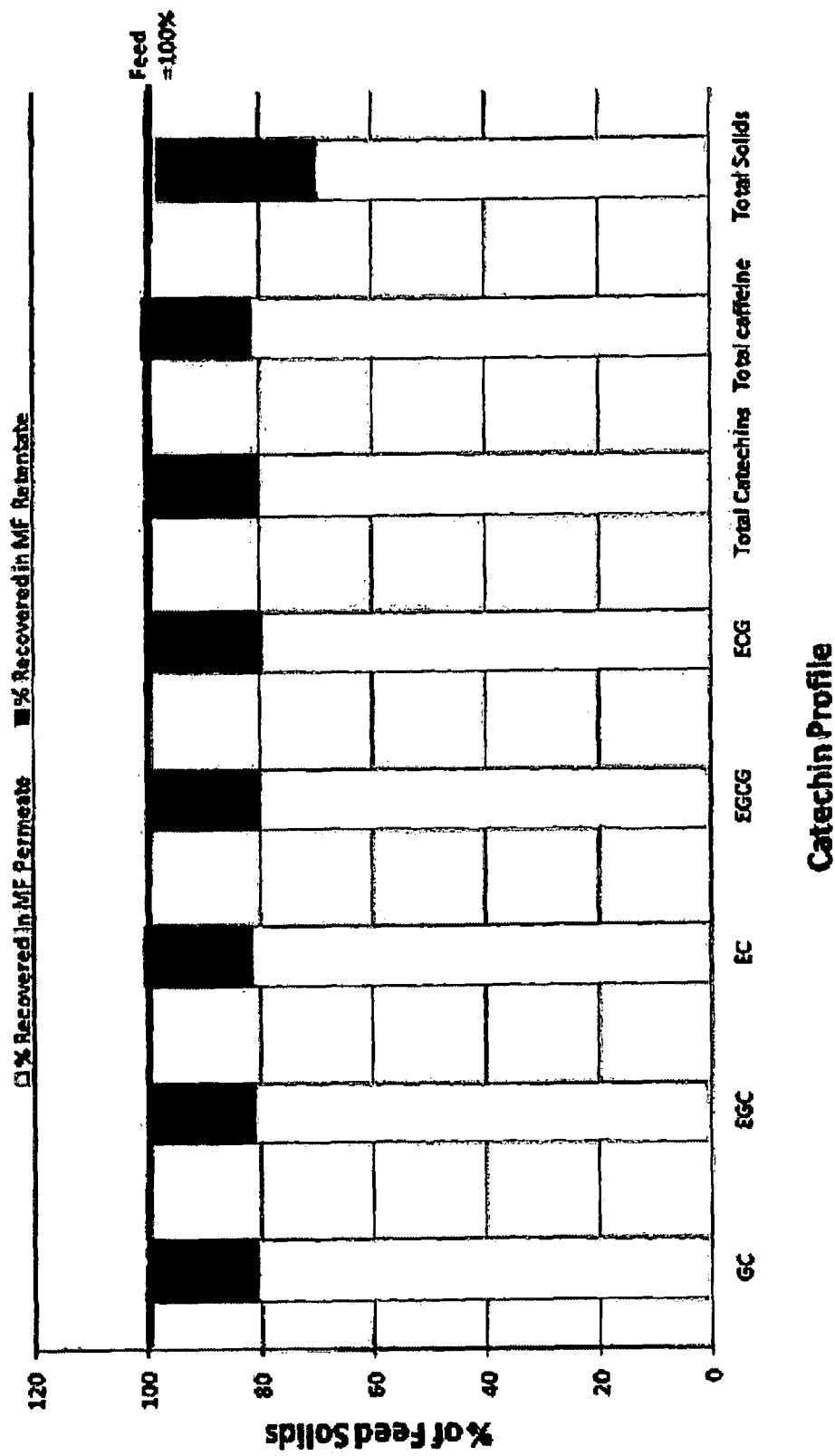
FIG. 16 is a graph showing a microfiltration mass balance of catechins and caffeine recoveries in permeate and retentate. Results are as a percentage of the composition starting material Choladi TGFT feed which is at 100%.
Figure 17:
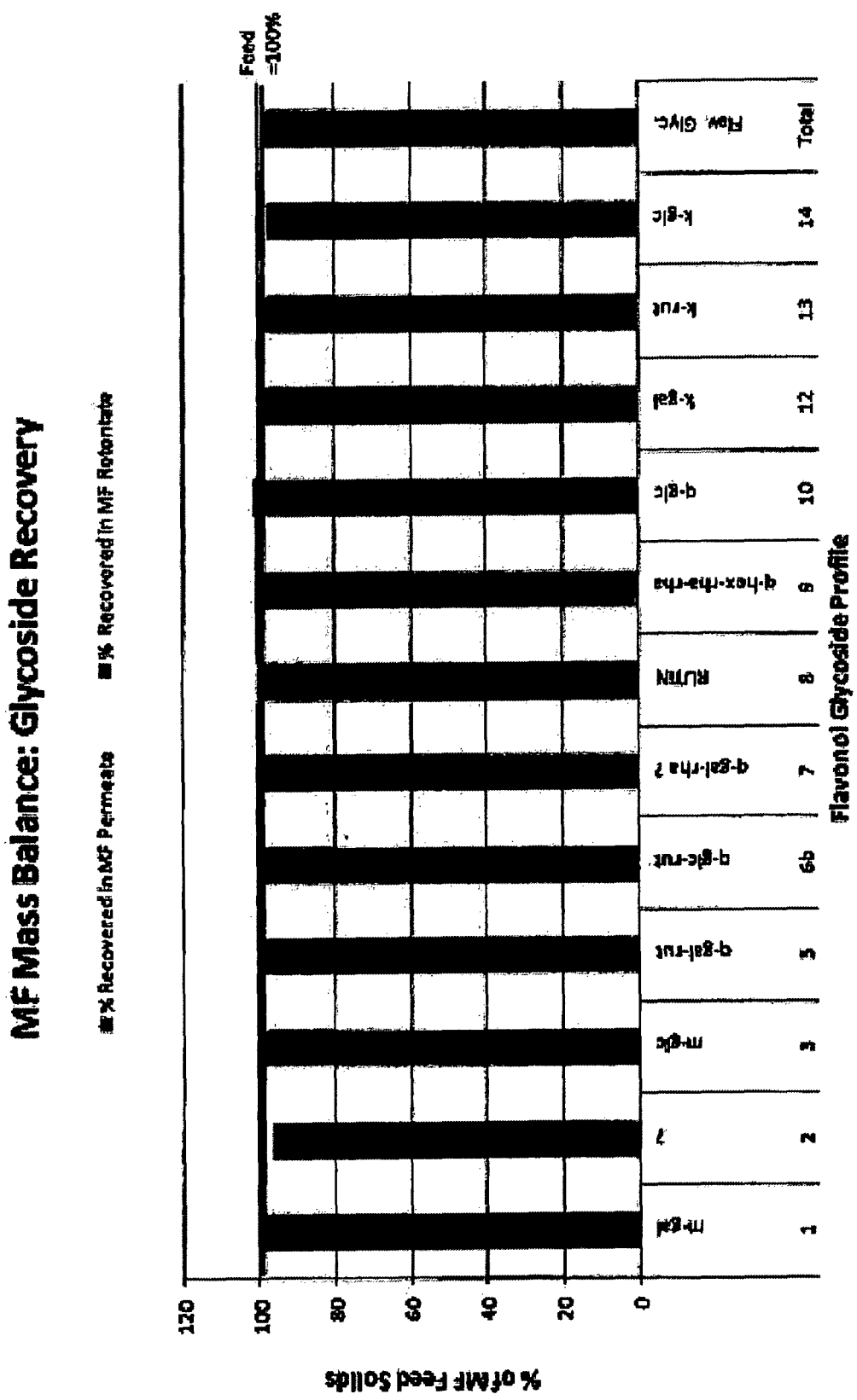
FIG. 17 is a graph showing a microfiltration mass balance of flavonol-glycoside recoveries in permeate and retentate. Results are as a percentage of the composition starting material Choladi TGFT feed which is at 100%.

Ultra Filtration (UF) Mass Balance: Additionally, a mass balance of each of caffeine, catechins and flavonol-glycosides in permeate and retentate was determined through the MF membrane process. Results show nearly a complete recovery of most compounds in both the permeate and retentate. The results are consistent with the intended 80:20 split between permeate and retentate (FIGS. 16 and 17).

Figure 18A:
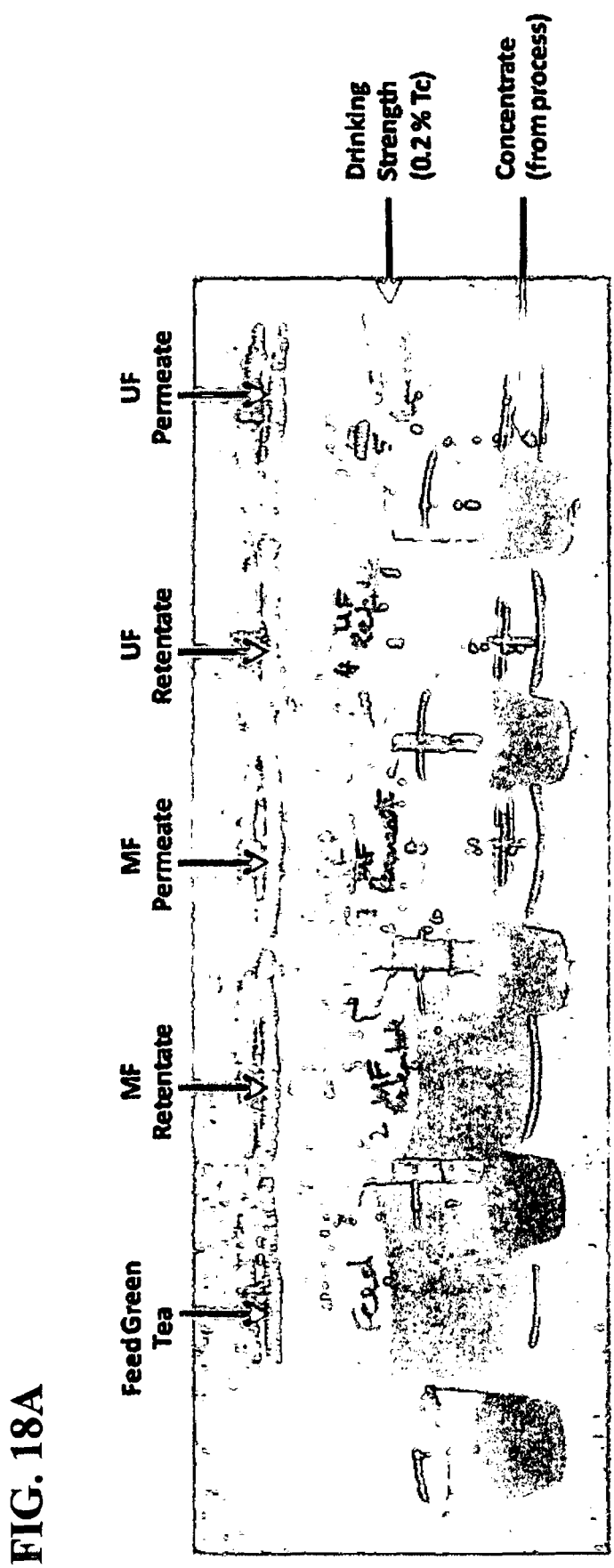
FIGS. 18A and 18B are photographs showing side-by-side comparisons, from left: Choladi feed (reconstituted TGFT powder at 4% Tc); MF retentate and permeate; UF retentate and permeate. The back liquids are at drinking strength (0.2% Tc) and the front liquids are concentrates from the process with solids content of about 4%.
Figure 18B:
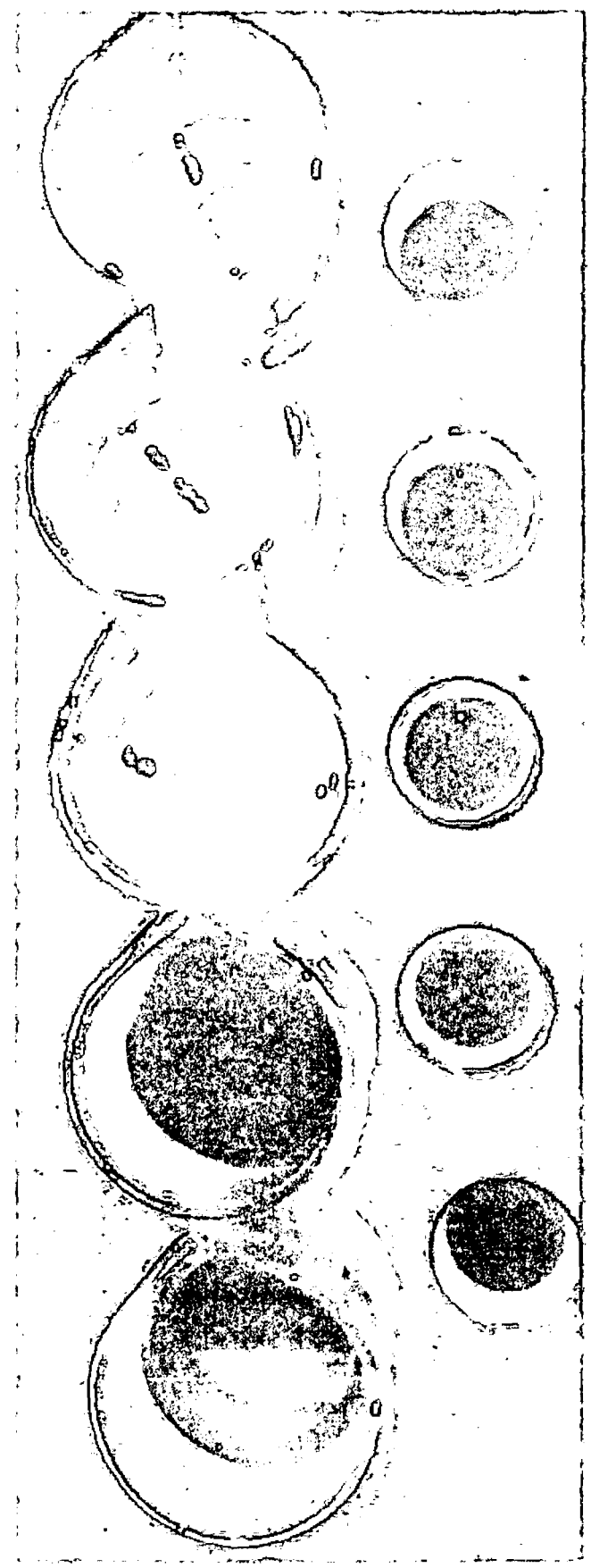

Ultra Filtration (UF) Visual & Sensory: UF used the "prefiltered" MF permeate as a feed stream, which would help slow or prevent fouling of the UF membranes. Both the UF permeate and the UF retentate had a similar appealing yellow color at drinking strength (FIGS. 18A and 18B). Both were flavorful and balanced, with the UF permeate judged less B&A than the retentate. Compared to the commercial product at the same solids content, the UF permeate was much less B&A, less green, and much more gulpable and refreshing.

Figure 19:
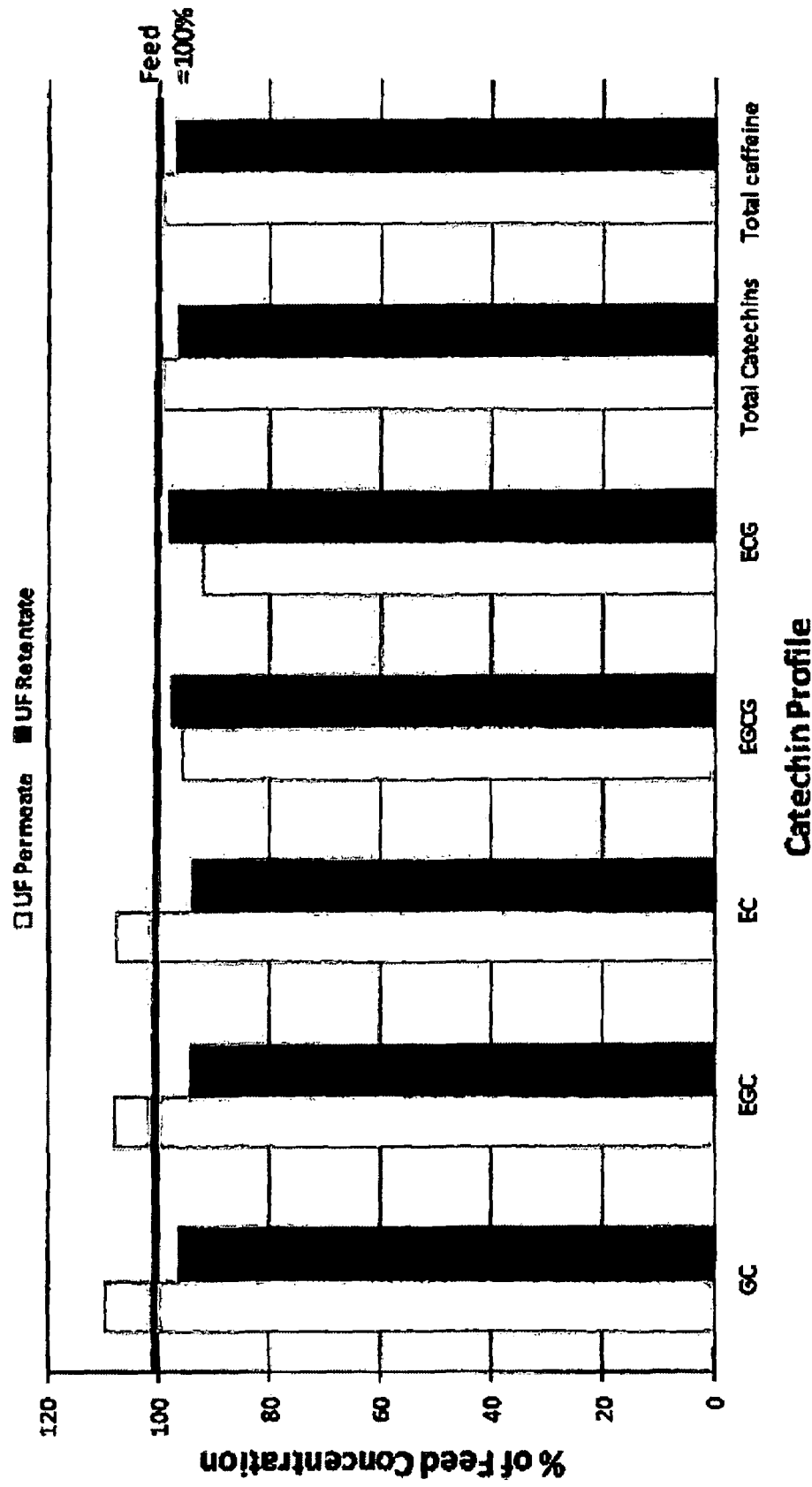
FIG. 19 is a graph showing ultra filtration recovery of catechins and caffeine relative to microfiltration permeate feed (100%).
Figure 20:
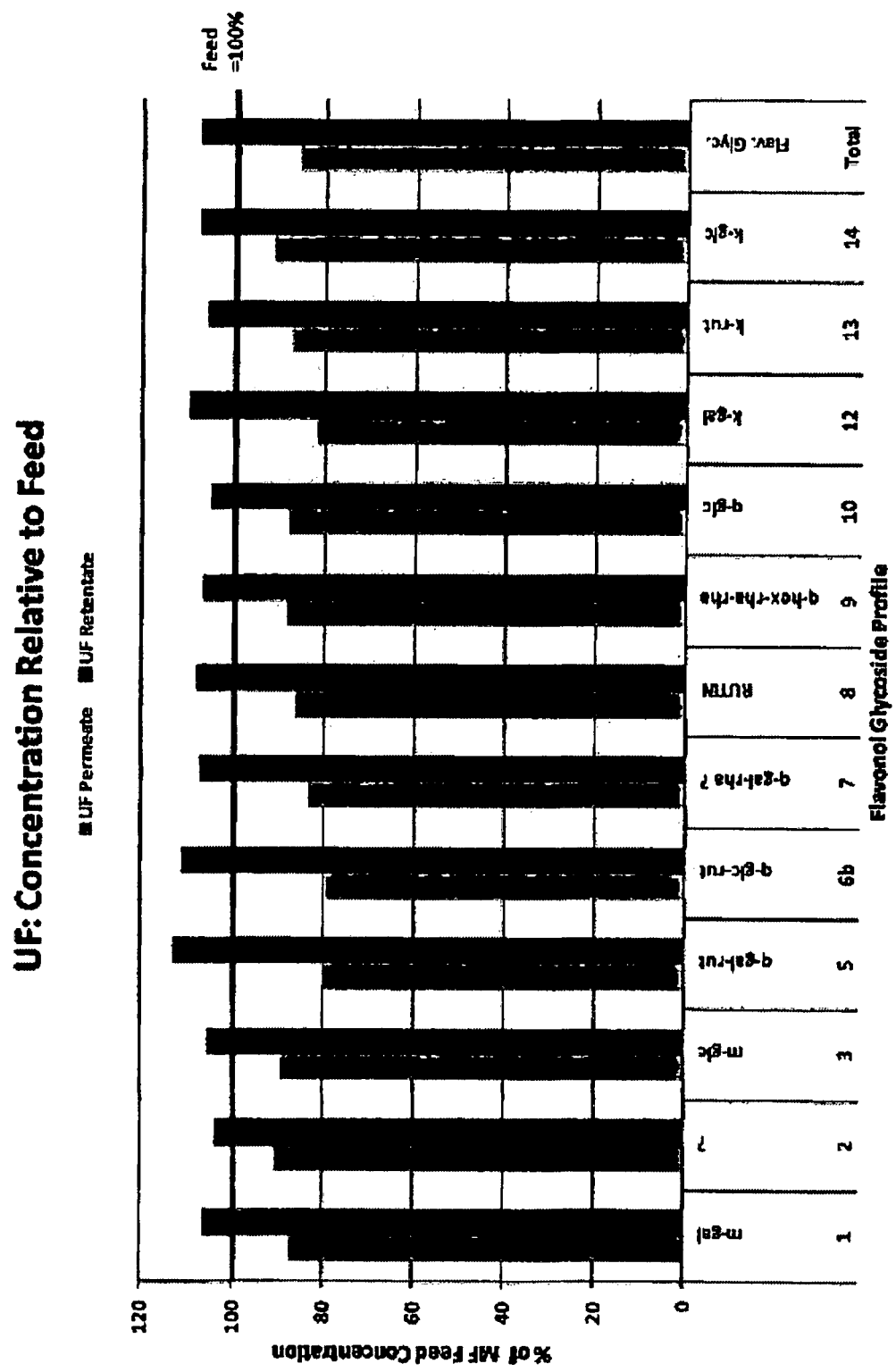
FIG. 20 is a graph of ultra filtration recovery of flavonol-glycosides relative to microfiltration permeate feed (100%).

Analytical Results for UF Membrane: Overall, when comparing the UF permeate to the UF retentate, the individual catechin compounds varied only about 10-20% for the feed values (FIG. 19). The early eluting compounds can be seen to be slightly higher while the later eluting catechins were slightly lower in the permeate. When comparing the UF permeate to retentate, the flavonol glycosides were slightly higher in the retentate and slightly lower in the permeate (FIG. 20). These results might partially explain the sensory differences observed, assuming flavonol glycosides have significant B&A flavor attributes.

Figure 21:
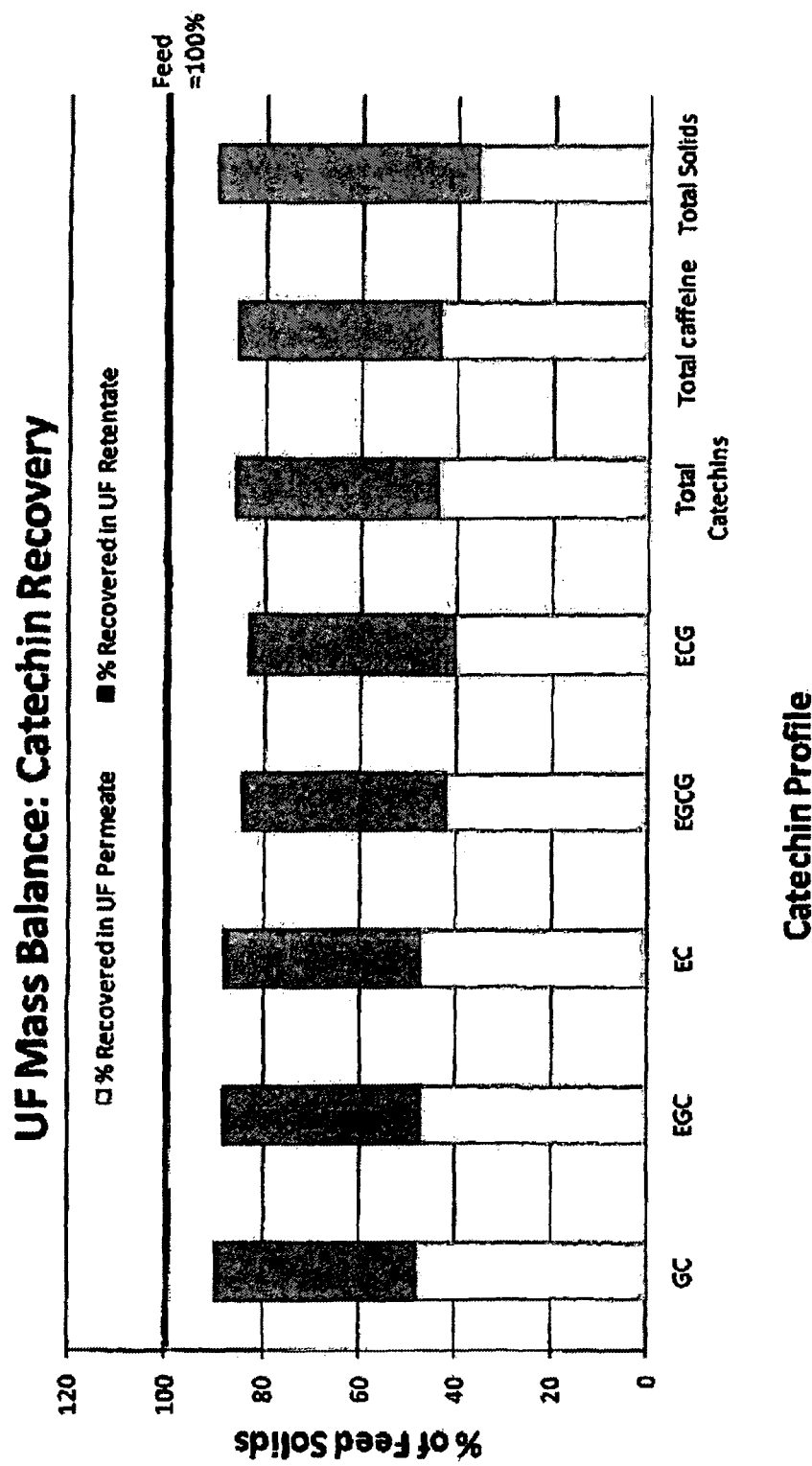
FIG. 21 is a graph showing ultra filtration mass balance: percent catechins, caffeine and total solids recovered in permeate and retentate with feed at 100%.
Figure 22:
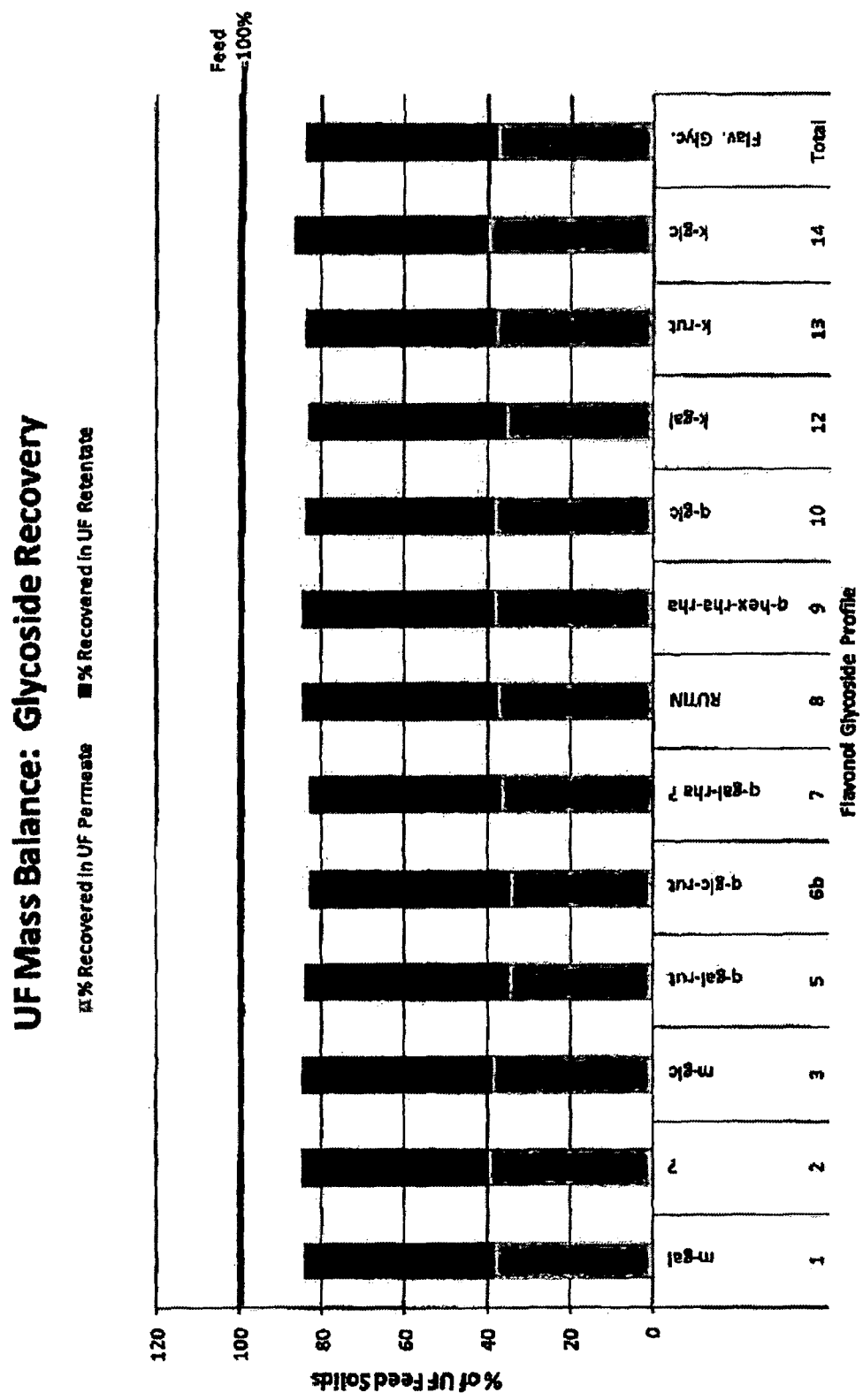
FIG. 22 is a graph showing ultra filtration mass balance: percent flavonol-glycosides recovered in permeate and retentate with feed at 100%.

UF Mass Balance: A mass balance of the individual catechin and glycoside compounds was determined and could only account for about 80-90% of each of the catechins (FIG. 21), and only 80-85% of each of the glycoside compounds (FIG. 22). An undetermined error, possibly a % Tc error in one of the samples could be responsible, but this cannot be confirmed. For the recovery calculations this could be due to tea solids analyses where a small deviation from the actual value greatly emphasized the error. The high temperature (about 70° C.) to which samples had to be heated to re-dissolve the tar-like "cream" or sediment may have caused moisture losses affecting the Tc results (FIGS. 21 and 22).

Figure 23:
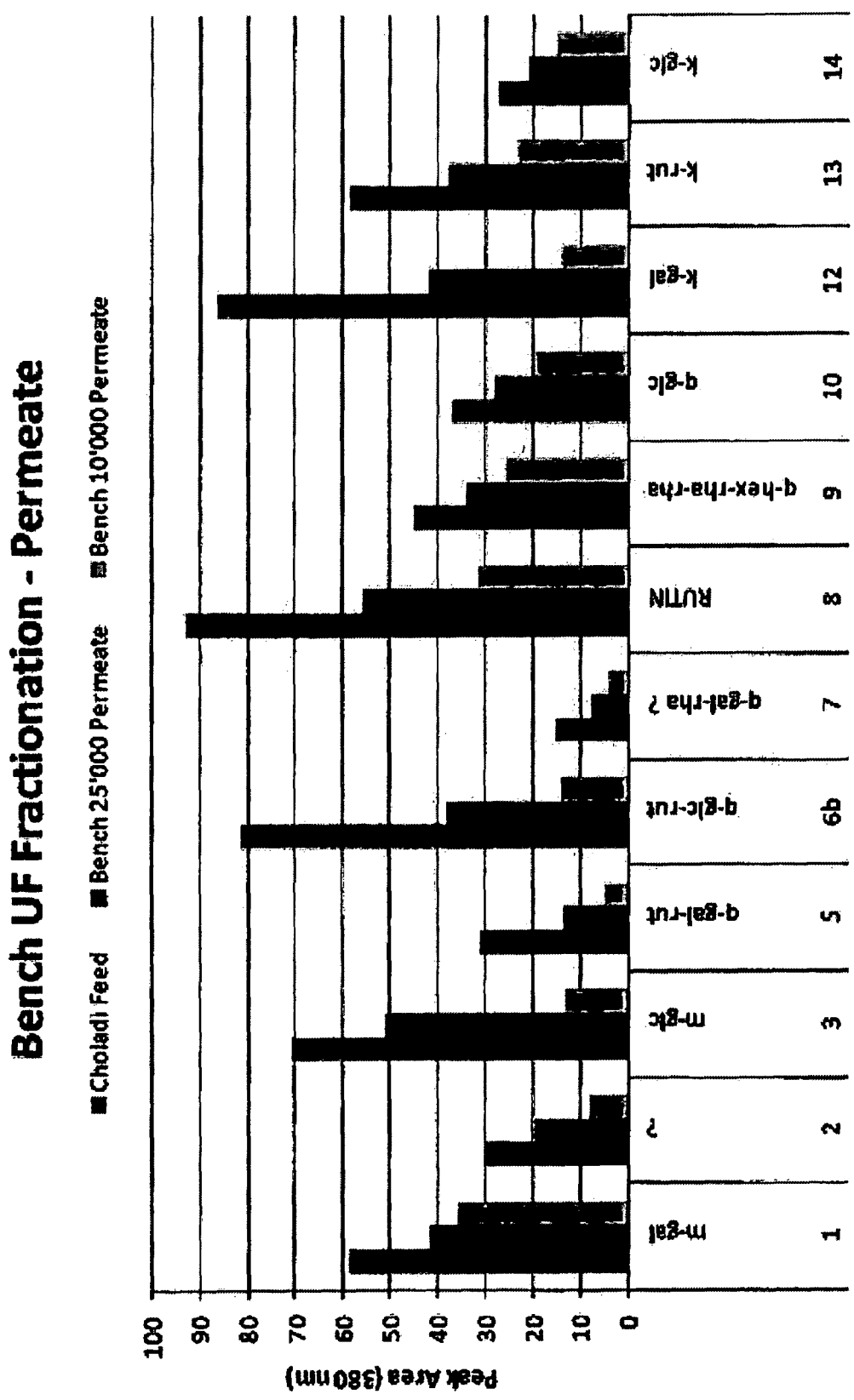
FIG. 23 is a graph showing flavonol-glycosides in permeates from bench with 10,000 and 25,000 MWCO membranes.
Figure 24:
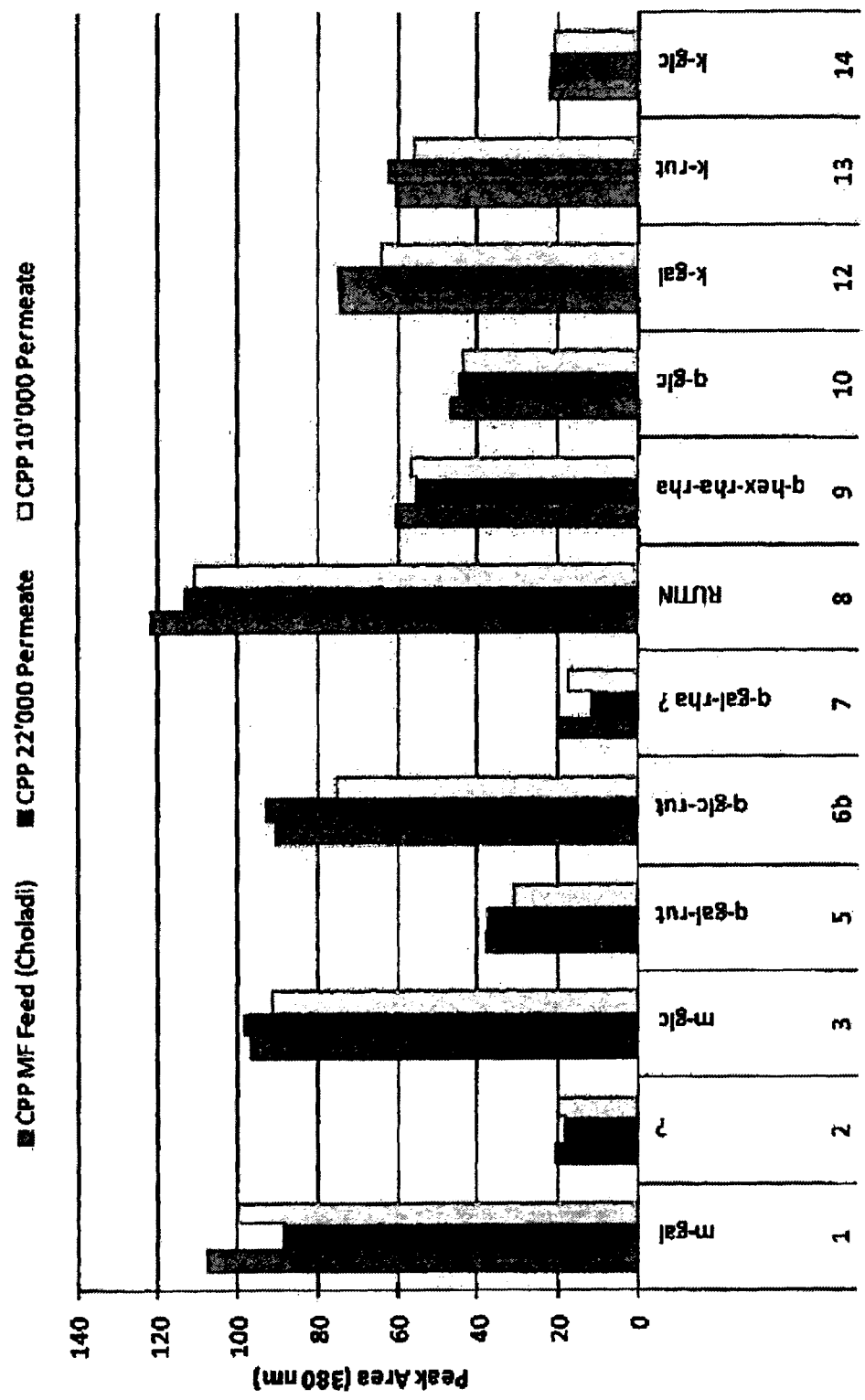
FIG. 24 is a graph showing flavonol-glycosides in permeates from CPP with 10,000 and 25,000 MWCO membranes.

Co-Pilot Plant (CPP) Spiral Membranes—Comparison with Bench-top Flat-Sheet Membranes: An important comparison was between the permeates obtained from bench-top work using flat-sheet membranes and CPP using spiral membranes. In FIG. 23, the decrease in flavonol-glycosides (believed to be flavor impact compounds associated with bitterness) are shown going from 25,000 to 10,000 MWCO membranes. FIG. 24 shows the same comparison, but in the CPP with spiral membranes. FIGS. 23 and 24 clearly show that the same level of fractionation was not achieved in the CPP, even though RTF showed that UF 10,000 retentate was much higher in flavonol-glycosides than the permeate, as judged by the amount of sediment that formed.

A surprising discovery was previously made when a sediment formed after freezing CPP MF permeate at −20° C. The sediment was isolated after slow thawing in a refrigerator followed by siphoning of the supernatant. Upon reconstituting the supernatant and sediment to drinking strength (0.2% tea solids content), the supernatant was found by a technical sensory panel to have less B&A compared to commercial Choladi feed and was flavorful, smooth and refreshing. Contrary, the sediment was intensely and objectionably B&A with strong persistency (lingering aftertaste).

Repeat CPP trials were performed to obtain MF permeate and investigate and compare sedimentation (fractionation/creaming) at frozen (−20° C.) and refrigerated temperatures (4 and 8° C.). There was concern about the practical application in a commercial operation of freezing large volumes of clarified and MF treated green tea extract. Refrigeration temperatures would be more practical, but first investigation was required regarding how effective these conditions would be compared to freezing. Specifically, freezing may have had an important contribution to sediment formation through freeze concentration to achieve this fractionation, whereas refrigeration may not have the same effect and benefit. MF permeate would also be subjected to ultra filtration using 22,000 and 10,000 MWCO membranes to remove B&A compounds such as flavonol-glycosides. UF permeate and retentate fractions would also be tested for low temperature fractionation. MF permeate samples were held at low temperatures (8, 4 and −20° C.) for 12 to 24 hours to determine if a temperature induced sedimentation could result in supernatants low in B&A.

RTF of 10,000 MWCO UF Permeate and Retentate: The MF permeate and retentate fractions were freeze dried immediately after being made in the CPP, so the UF permeate and retentate had to be stored overnight at 4° C. to await freeze drying the next day. Unintentionally, RTF took place during this approximate twelve hour time period, and the next morning both fractions showed sedimentation. From this it was clear that the UF retentate visually formed much heavier sediment than UF permeate. The implication is that the 10,000 MWCO membrane was effective in retaining compounds which then concentrated into the retentate and with RTF produced a heavier sediment than the permeate. Sensorially, before RTF the permeate had less B&A than the retentate. After RTF they were more similar in B&A, and both supernatants had much less B&A than the commercial green tea.

Effect of RTF on Supernatant Composition: In the supernatant, the following trends were noted: (1) EGC, GC and EC increased incrementally by about 5.5 to 8.5% each time from MF feed to MF permeate to MF supernatant to UF supernatant (FIG. 25); and (2) EGCG, ECG and caffeine decreased by 12%, 17% and 29%, respectively. These net decreases are due to losses through sedimentation/creaming where these compounds were high in concentration and made up 55 to 65% of sediment composition. These findings are confirmed through the analyses of the sediment (FIG. 26).

This apparent small net increase in EGC, GC and EC content is not due to the formation of new compound or due to fractionation. Rather, comparing the supernatant to the feed extract, it is due to a change in total solids content as a consequence of depleting or removing solids, such as haze and insoluble compounds. Compared to the MF permeate, the observed increases are due the removal of other soluble solids due to creaming/sediment formation.

The drop in total solids (8.0%) content between MF feed and MF permeate indicates the loss of insoluble material. The further drop in Tc (7.2%) due to RTF is representative of a loss in solids in the sediment associated with B&A.

The total catechin (by HPLC) and total flavonoid content (by FC) did not show any significant decrease although several individual compounds changed.

Sediment Characteristics: The commercial CWS green tea extract manufactured in Choladi, India undergoes two clarification (centrifuge) steps at 10° C. Therefore, to "force" further "creaming/sedimentation" the temperature needed to be dropped below 10° C. Tar-like sediment only formed after MF treatment and upon reducing the temperature below 10° C. This same type of sediment does not form in the normal dissolved commercial Choladi green tea powder which is hazy. The complete removal of insoluble compounds and "nucleation sites" is apparently necessary for this special tar-like cream to form.

Another characteristic of this sediment is that it is difficult to dissolve, and RO water at about 85° C. was added to the milk jug to dissolve and remove it. Immediately upon cooling it had a very strong propensity to continue to sediment.

Figure 27:
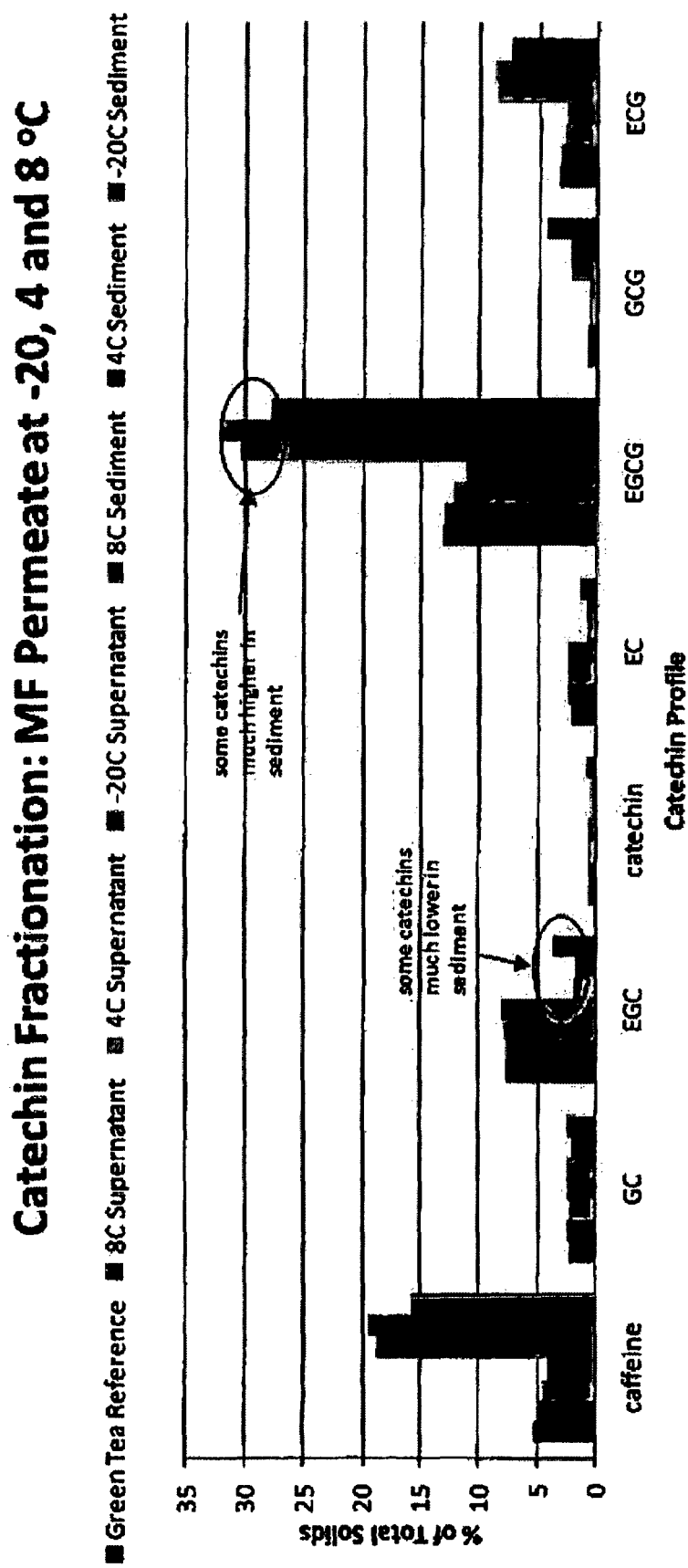
FIG. 27 is a graph showing an assessment of the catechin and caffeine composition in supernatant and sediments that formed from MF permeate subjected to RTF treatments (4, 8 and −20° C.). Results are shown as a percentage of total solids (% db).
Figure 28:
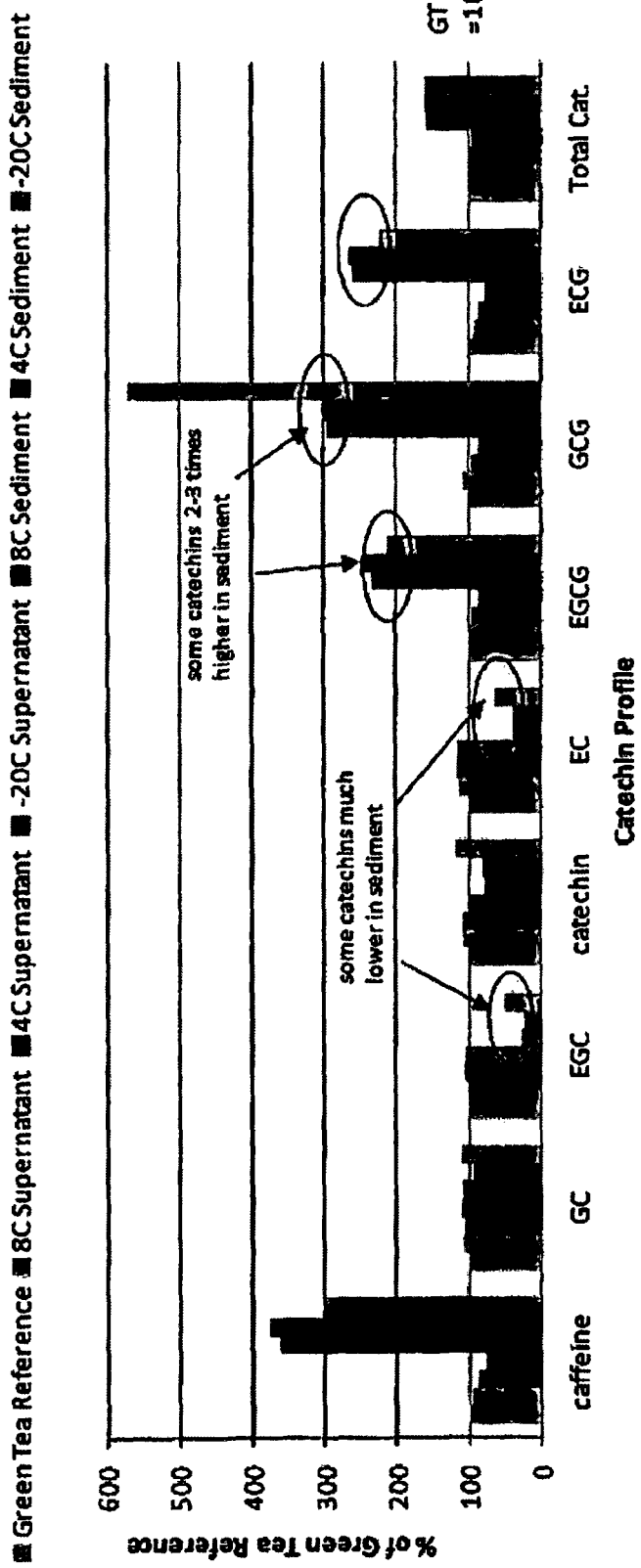
FIG. 28 is a graph showing an assessment of the catechin and caffeine composition in supernatant and sediments that formed from MF permeate subjected to RTF treatments (4, 8 and −20° C.). Results are shown as a percentage of the Choladi green tea feed (100%).
Figure 29:
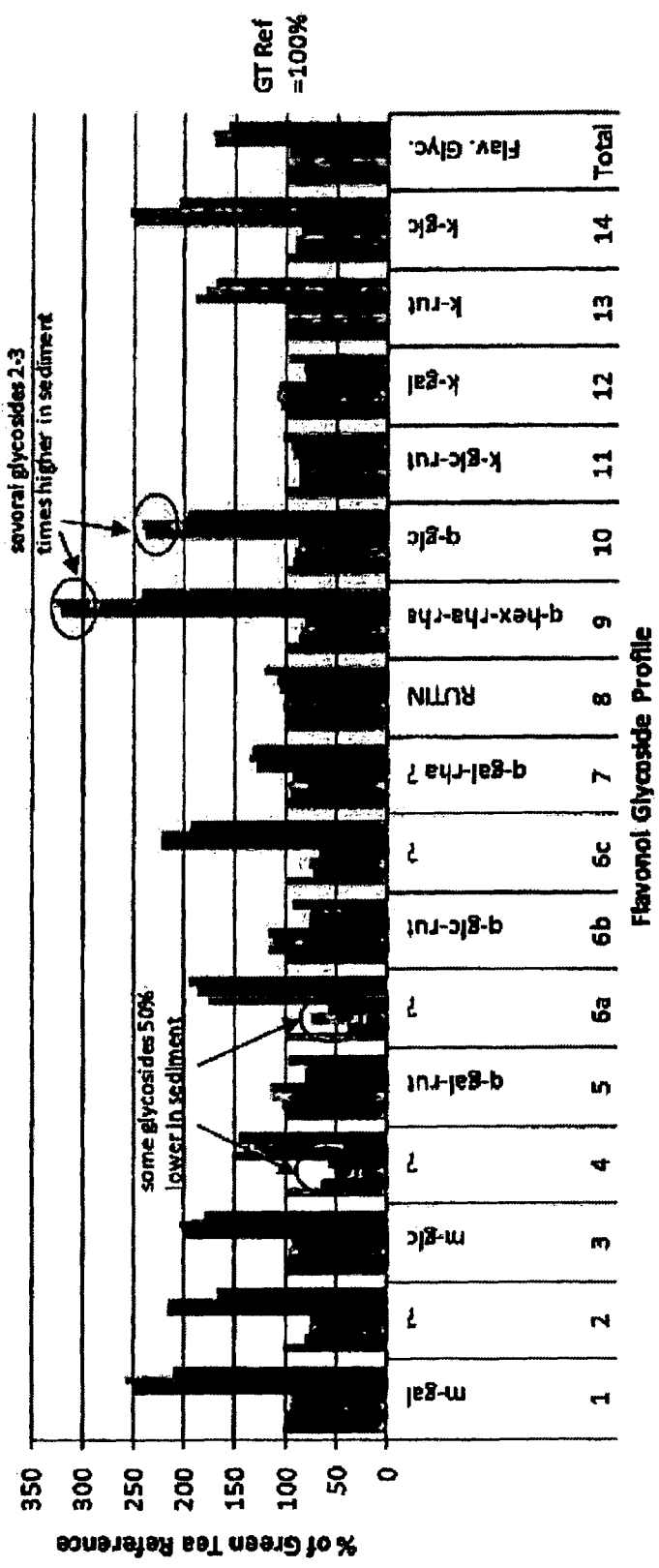
FIG. 29 is a graph showing an assessment of the flavonol-glycoside composition in supernatant and sediments that formed from MF permeate subjected to RTF treatments (4, 8 and −20° C.). Results are shown as a percentage of the Choladi green tea feed (100%).
Figure 30:
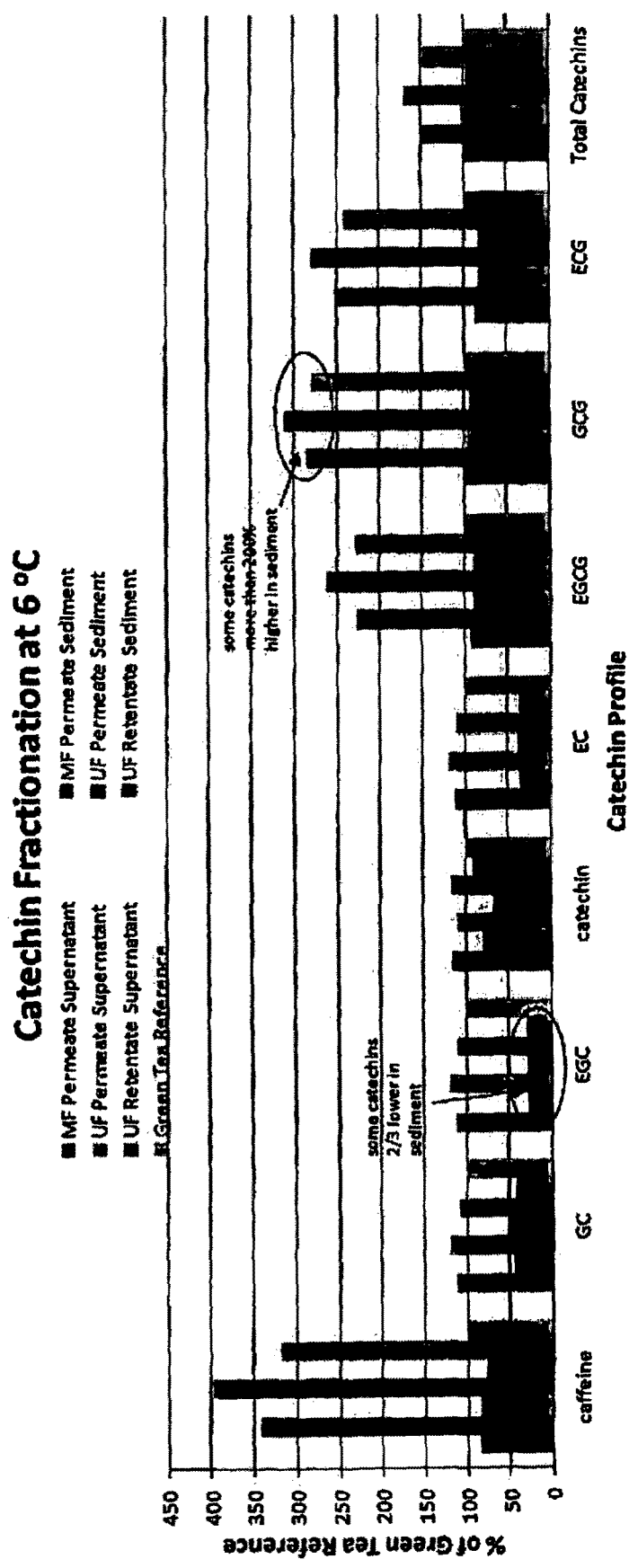
FIG. 30 is a graph showing an assessment of the catechin and caffeine composition in supernatant and sediments that formed in MF and UF permeates and retentates subjected to RTF treatment (6° C.). Results are shown as a percentage of green tea reference (Choladi feed at 100%).
Figure 31:
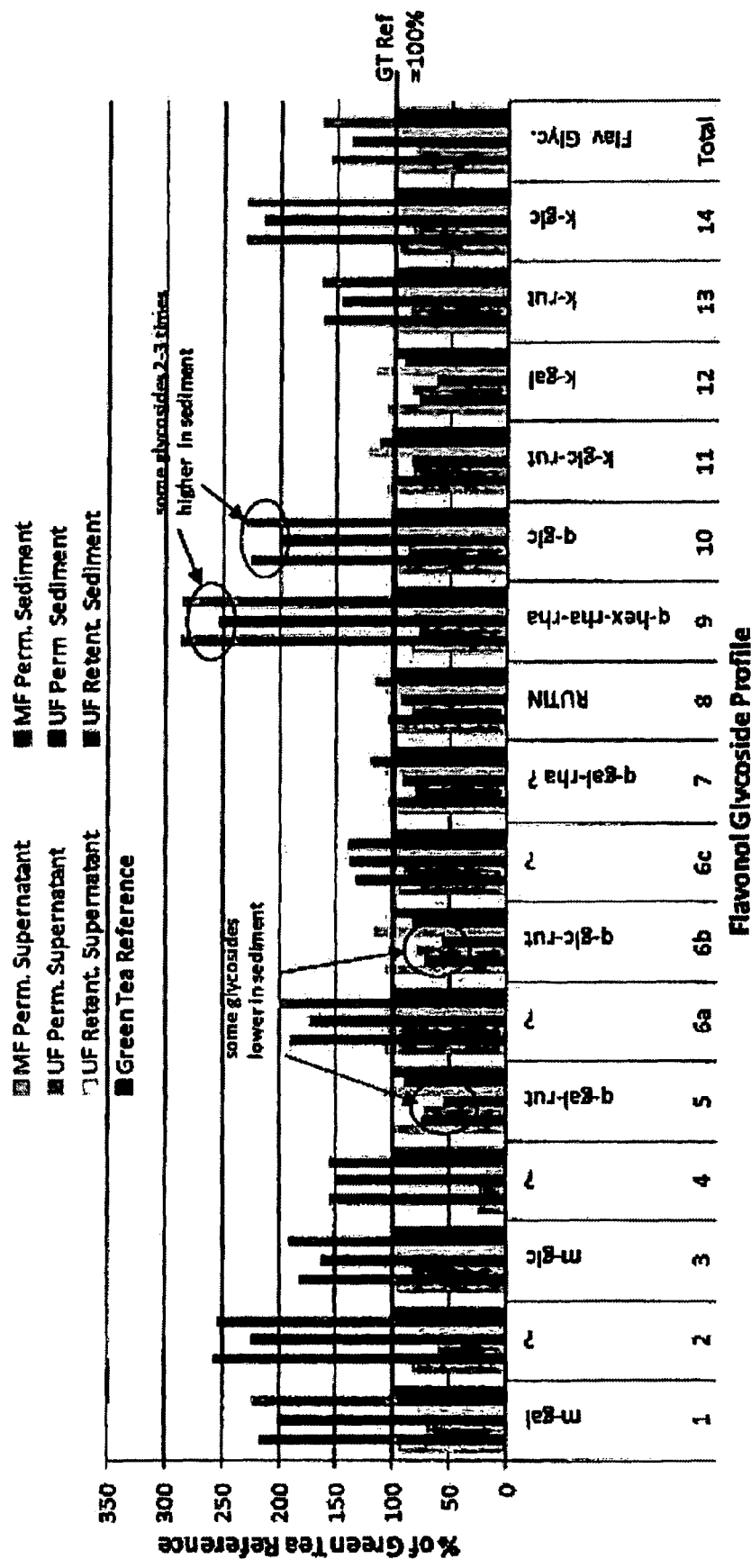
FIG. 31 is a graph showing an assessment of the flavonol-glycoside composition in supernatant and sediments that formed in MF and UF permeates and retentates subjected to RTF treatment (6° C.). Results are shown as a percentage of green tea reference (Choladi feed at 100%).

Approximately 61 to 71% of the sediment composition is known. From FIG. 26, caffeine content was about 17 to 21%; EGCG content from about 30 to 34%; and ECG content was about 8 to 9% (see also FIGS. 27 and 28). Sediment was lower in EGC, GC and EC which did not partake in the sediment formation (FIG. 26). Additionally, MF permeate, UF permeate and retentate were kept at 6° C. to compare catechin and flavonol-glycoside profiles between the three types of samples (FIG. 26). Some of the catechins (EGCG, GCG and ECG) and caffeine in the sediment can be seen to be 2-3 times higher than the feed. Catechins such as EGC and EC are about 2 to 3 times lower (see FIGS. 27, 28 and 30). In FIGS. 29 and 31 some of the flavonol-glycosides in the sediment can be seen to be 2-3 times higher than in the feed. These compounds might play an important role in the B&A flavor attributes. Conversely, some are lower in the sediment and less likely to be influencing B&A.

Sensory characteristics of the sediment: Sensorially, the sediment in all cases were very B&A and persistent. In this trial, sensory assessment of different fractions was performed at the same solids content (0.20% Tc). Sediment was also tasted at 0.10% Tc with similar comments of B&A and persistency (lingering).

Figure 32:
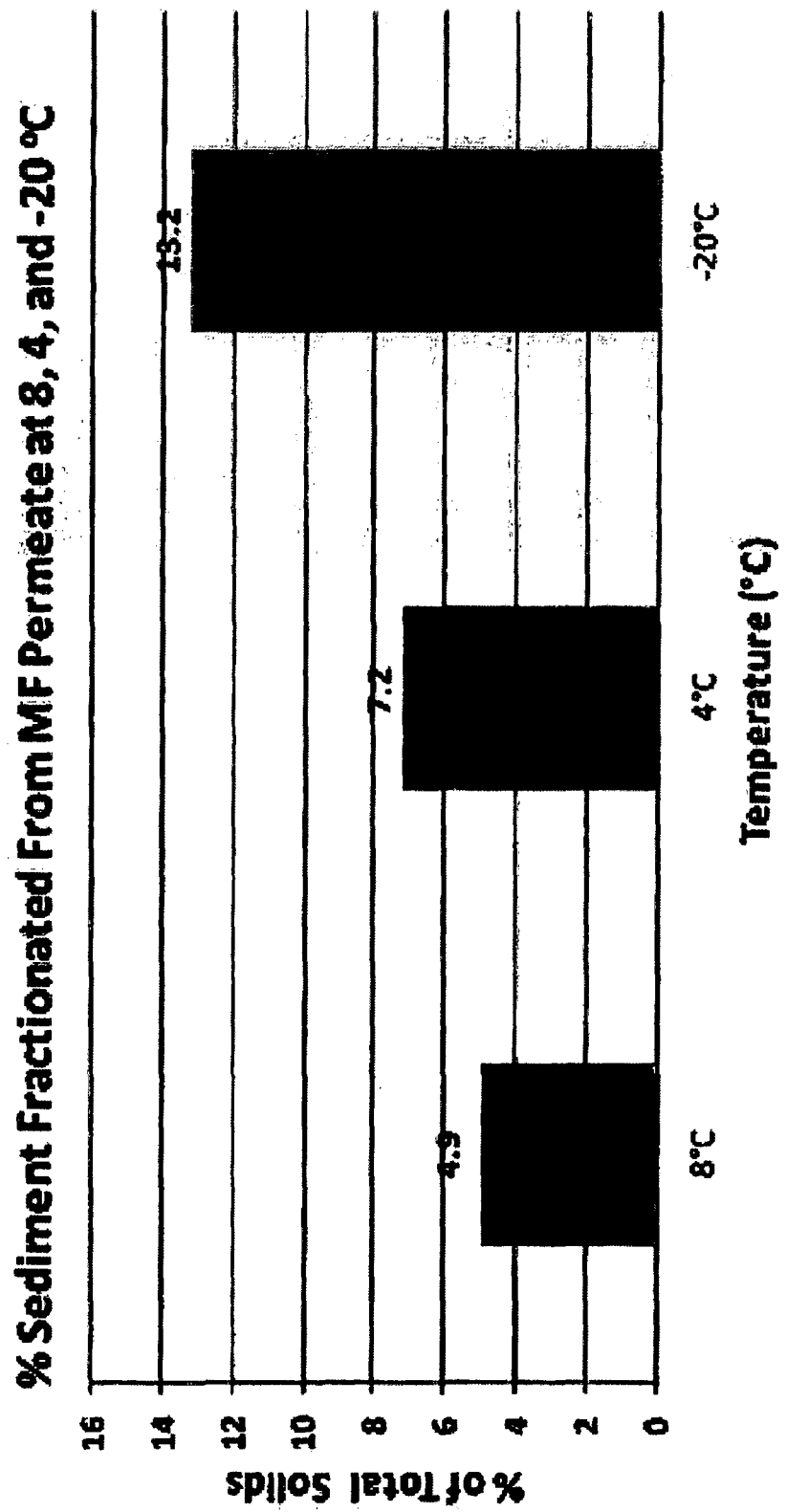
FIG. 32 is a graph showing the effect of temperature on reduced temperature fractionation (RTF) of MF permeate mass balance of percent sediment formed based on total solids at 8, 4 and −20° C.
Figure 33:
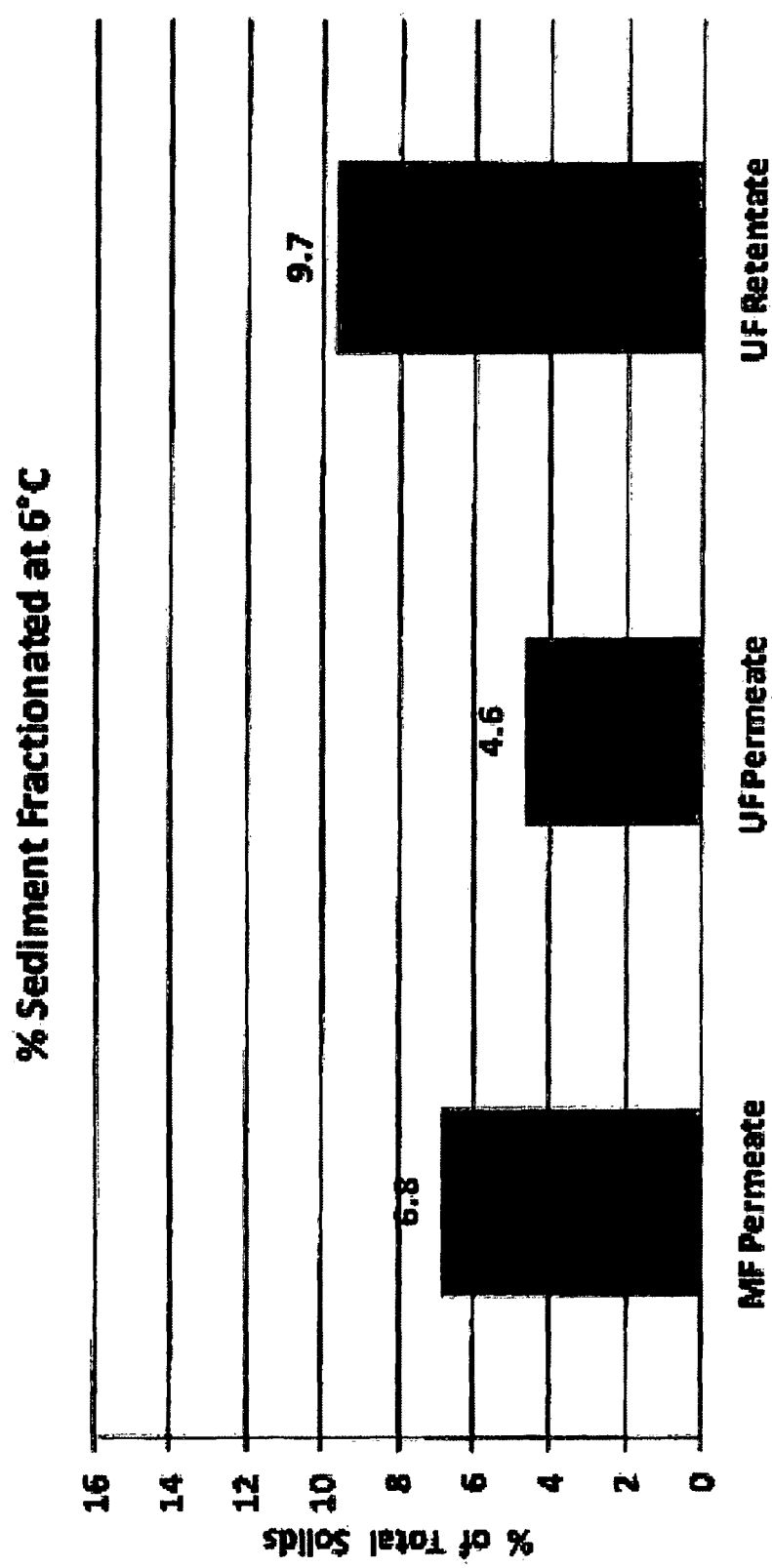
FIG. 33 is a graph showing percent sediment based on total solids content formed at 6° C. in MF permeate and UF permeate and retentate from reduced temperature fractionation (RTF).

Mass Balance of Sediment Formation during RTF: The total solids fractionated from MF permeate by reducing temperature were quantified and the mass balance calculated between the supernatant and the sediment. Lowering the temperature (from 8 to 4 to −20° C.) increased the overall percentage of solids forced to sediment to 5, 7 and 13%, respectively (FIG. 32). A secondary test was conducted at 6° C. on three different streams (MF permeate, UF permeate and UF retentate). The highest level of sedimentation was found with the UF retentate (10%) as shown in FIG. 33. The higher molecular weight compounds are retained by the 10,000 MWCO membrane filter and concentrated in the UF retentate, thereby increasing their tendency to sediment as the temperature is reduced. This result also serves to support the finding that UF at 10,000 MWCO is effective in fractionating these compounds that are associated with B&A and persistency. If RTF of MF permeate is not an option, then UF with 10,000 MWCO may achieve a similar goal by removing flavonol-glycosides that are associated with B&A.

Summary

Exploratory Benchtop UF Studies with Flat-Sheet Membranes

UF permeate—catechins and caffeine: Membranes at MWCO of 500 and 1,000 were so "tight" that no typical intrinsic tea compounds passed through the membranes in permeate, as evidenced by the complete absence of all compounds. MWCO 500 and 1,000 membranes may be used for concentration purposes (as for RO applications). This may be important for a temperature sensitive application for concentration, in particular for a high quality tea. Generally for all of the membranes from MWCO 5,000 to 120,000, there was an increase in total catechins from about 32% in the feed material to 44% in the UF permeate. For 5,000, 10,000, 25,000 and 50,000 MWCO membranes, the total catechin content increased to 44, 42, 40, 39 and 40%, respectively. Certain catechins and caffeine selectively increased in concentration in the UF permeate. For 5,000 and 10,000 MWCO membranes, EGC increased from 8% to about 16%; EC increased from 2% to about 5%; GC also almost doubled from 1.5% to 3%; and caffeine increased from about 6% to about 9%.

UF retentate—catechins and caffeine: For UF retentates, only minor changes were observed in the caffeine and catechin composition for all membranes tested.

UF permeate—flavonol-glycosides: The most dramatic effect of UF was on the flavonol-glycosides. In order, MWCO membranes 5,000>>10,000>>25,000 were effective in lowering all flavonol-glycosides. Although some lowering was also seen with 50,000, almost nothing was observed at 100,000 and 120,000 MWCO.

UF retentate—flavonol-glycosides: The greatest increases seen in retentates in flavonol-glycosides were with the 10,000 and 25,000 membranes. This result is in line with the findings with the permeates where these compounds did not pass through the membranes and therefore became more concentrated in the retentate. Based on these findings, 22,000 and 10,000 MWCO spiral membranes were selected for CPP work. Testing would start with the 22,000 membrane to benefit from its higher flux.

Co-Pilot Plant (CPP) Microfiltration (MF)

MF (0.1 μm) was applied to reconstituted Choladi commercial green tea extract (4% Tc) to investigate its effect to provide "highly polished" material with all insoluble compounds removed. MF treatment resulted in significant visual and sensory changes. Compositionally, minor changes in catechins and flavonol-glycosides were observed mainly because of solids content differences, and no fractionation took place on a molecular level. The MF permeate had high clarity and an appealing bright yellow character when diluted to drinking strength (0.2% Tc). It had a flavorful, balanced tea character without the typical "green" (grassy/leafy/bushy/shrubby) taste and aroma found in the standard Choladi green tea product. Tasters described this fraction as much less leafy/green; less overall flavor still astringent, but well balanced. Some tasters preferred this fraction for its overall very clean taste and great clarity. The MF retentate retained the green chlorophyll-like compounds and was strong in "green" taste (flavor) and aroma character. This fraction was also turbid since all the insoluble compounds and typical Choladi green tea haze were concentrated into this fraction. Tasters described this fraction as much more green/leafy with "juicy" character and high overall flavor.

Co-Pilot Plant (CPP) Ultra Filtration (UF)

The MF permeate was used as the feed for all UF. CPP UF with 22,000 MWCO membrane did not give fractionation of catechins and flavonol-glycosides, but had high flux compared to the 10,000 membrane. The 10,000 MWCO membrane gave significant fractionation of the flavonol-glycosides, with much less sediment in the permeate (4.6%) than the retentate (9.7%) after RTF at 4° C. Analytical results of the flavonol-glycosides after UF with the 10,000 MWCO membrane did not give the same extent of catechin or flavonol-glycoside fractionation in the CPP as was observed with bench work using flat sheet 5,000, 10,000 and 25,000 MWCO membranes. Sediment associated with B&A and persistency was concentrated in the UF retentate. Membranes with an even lower MWCO than 10,000, such as 5,000, may be needed to achieve more significant fractionation at larger scale (CPP).

Freeze dried 10,000 MWCO UF permeate may have had its glass transition temperature lowered, presumably due to the removal of larger molecules, and was unstable at RT and "collapsed" on itself. It is stable at −20° C. None of the other MF fractions experienced this physical change, and UF retentate was also stable at RT. UF permeate was light in color.

On the bench, 5,000 and 10,000 MWCO flat sheet membranes gave good fractionation of catechins on a molecular level. The spiral 10,000 MWCO membrane did not give the same catechin fractionation as with the bench studies.

All final freeze dried fractions were submitted for microbiological testing and were clean of *salmonella*, APC, *enterobacter* (EB), yeast and molds.

Reduced Temperature Fractionation (RTF) Supernatant Characteristics

Lowering the temperature of MF permeate, UF permeate and UF retentate to 8, 4 and −20° C. resulted in a tar-like sediment to form from each of these liquids at 5, 7 and 13% of the total solids, respectively. RTF material could easily be separated into supernatant and sediment fractions. MF and UF permeate supernatants had excellent clarity with less green color and flavor than the standard Choladi product and had significantly reduced B&A with good tea flavor. Sensory descriptors such as "gulpable, flavorful, smooth and refreshing" were used. From this study, it is clear that the removal of a small fraction significantly impacts the sensory characteristics. This fractionation does not involve the total removal of compounds, so this reduction in perceived negative characteristics is because they drop below the sensory threshold. RTF removes compounds that are undesirable in cold water soluble (CWS) tea formulations. Removing these compounds may enable production CWS tea powders that are high in antioxidants but without the bitterness and that are more soluble at ice-water temperatures.

RTF Sediment Characteristics:

Regular commercial Choladi TGFT liquor does not form this same type of tar-like sediment. Rather, 4% Tc at 4° C. the sediment is more "settling of a suspension" which is easily disrupted and re-suspended by shaking. The MF permeate may have no nucleation sites (highly "polished" with all insoluble compounds removed) and therefore the standard product with haze and insoluble compounds and numerous nucleation sites behaves differently and does not undergo the same type of complexation.

The behavior and appearance of this tar-like tea sediment was very different from normal tea "cream" which will re-dissolve at much lower temperatures (35 to 55° C.). This tar-like tea sediment was difficult to re-dissolve in hot RO water and >70° C. water was needed. RTF sediments (only about 5-10% of total solids) were extremely bitter, harsh and astringent with a persistent, undesirable lingering flavor character when tasted at normal (0.2%) and below normal (0.1%) drinking strength.

Freezing (−20° C.) resulted in the greatest degree of sedimentation, but above freezing (4 to 6° C.) conditions also resulted in a significant reduction in B&A, while maintaining good antioxidant levels and good tea flavor. Refrigeration is considered a more practical process to apply commercially compared to freezing. Reconstituted tar-like sediment (0.1 and 0.2% Tc) is hazy and darker brown in color. Approximately 70% of the sediment composition contains EGCG (30 to 34%), ECG (7 to 8%) and caffeine (13 to 21%). These compounds were 2 to 3 times higher in the sediment than in the permeate.

Certain flavonol-glycosides also increased in concentration in the sediment (2 to 3 times) and are presumed to be responsible for the intensely B&A and persistency notes when reconstituting and tasting this fraction at drinking strength (0.1 and 0.2% Tc). From tasting it this was clear that these were important negative flavor impact compounds and beneficial to remove to have a more refreshing final product. The sediments that formed during RTF from different fractions, or from the same liquid but at different temperatures (−20, 4 and 6° C.), were all similar in composition. Re-sedimentation quickly takes place from hot solution when the temperature drops. This fraction has a tremendous propensity for "creaming".

ABBREVIATIONS

AOX=antioxidant
B&A=bitterness and astringency
CI=confidence interval
CPP=co-pilot plant or mid-scale lab
CV=coefficient of variation
CWS=cold water soluble
DAD=diode-array detector
db=dry basis
EB=*enterobacter*
FC=Folin Ciocalteu (total polyphenols colorimetric method)
FD=freeze dried
HPLC=high performance liquid chromatography
HWS=hot water soluble
MF=microfiltration
MS=mass spectrometry or mass spectrometer
MW=molecular weight
MWCO=molecular weight cut-off
PPM=parts per million RO=reverse osmosis
RRF=relative response factors
RT=room temperature
RTF=reduced temperature fractionation
SD=spray dried
Tc=tea solids content
Tg=glass transition temperature
UF=ultra filtration It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method for reducing bitterness and astringency and/or increasing refreshing attributes of a green tea extract, the method comprising:
   performing microfiltration on the green tea extract to form a microfiltration retentate and a microfiltration permeate, wherein the green tea extract has a solid content between 1% and 30% before microfiltration;
   performing ultrafiltration on the microfiltration permeate to form an ultrafiltration retentate and an ultrafiltration permeate, wherein the ultrafiltration permeate has a reduced level of flavonol-glycosides relative to the green tea extract before the microfiltration, a concentration of antioxidants at least about equal to that of the green tea extract before the microfiltration, and a concentration of caffeine at least about equal to that of the green tea extract before the microfiltration; and
   using the ultrafiltration permeate to make a green tea product.

2. The method of claim 1, wherein the ultrafiltration is performed with a membrane having a molecular weight cutoff of 5,000 to 25,000 Da.

3. The method of claim 1, wherein the green tea product is made by spray drying or freeze drying the ultrafiltration permeate into a powder.

4. The method of claim 1, wherein the green tea product is a ready-to-drink beverage made by diluting the ultrafiltration permeate.

5. The method of claim 1, wherein the green tea product is made by adding the ultrafiltration permeate to a nutritional composition.

6. A method for reducing bitterness and astringency and/or increasing refreshing attributes of a green tea extract, the method comprising:
   performing microfiltration on the green tea extract to form a microfiltration retentate and a microfiltration permeate, wherein the green tea extract has a solid content between 1% and 30% before microfiltration; and
   performing reduced temperature fractionation on the microfiltration permeate to form a supernatant and a sediment.

7. A method for reducing bitterness and astringency and/or increasing refreshing attributes of a green tea extract, the method comprising:
   performing microfiltration on the green tea extract to form a microfiltration retentate and a microfiltration permeate, wherein the green tea extract has a solid content between 1% and 30% before microfiltration;
   performing ultrafiltration on the microfiltration permeate to form an ultrafiltration retentate and an ultrafiltration permeate, wherein the ultrafiltration permeate has a reduced level of flavonol-glycosides relative to the green tea extract before the microfiltration, a concentration of antioxidants at least about equal to that of the green tea extract before the microfiltration, and a concentration of caffeine at least about equal to that of the green tea extract before the microfiltration; and
   performing reduced temperature fractionation on the ultrafiltration permeate to form a supernatant and a sediment.

8. The method of claim 6, further comprising using the supernatant from the reduced temperature fractionation to make a green tea product.

9. The method of claim 6, further comprising spray drying or freeze drying the supernatant into a powder.

10. The method of claim 6, further comprising diluting the supernatant to make a ready-to-drink beverage.

11. The method of claim 8, wherein the green tea product is made by adding the supernatant to a nutritional composition.

12. The method of claim 8, wherein the green tea product is a concentrate.

13. The method of claim 6, further comprising using the sediment from the reduced temperature fractionation to make a food product.

14. The method of claim 6, wherein the green tea extract has a solid content of about 4% before the microfiltration.

15. The method of claim 7, further comprising using the supernatant from the reduced temperature fractionation to make a green tea product.

16. The method of claim 7, further comprising spray drying or freeze drying the supernatant into a powder.

17. The method of claim 7, further comprising diluting the supernatant to make a ready-to-drink beverage.

18. The method of claim 15, wherein the green tea product is made by adding the supernatant to a nutritional composition.

19. The method of claim 15, wherein the green tea product is a concentrate.

20. The method of claim 7, further comprising using the sediment from the reduced temperature fractionation to make a food product.

21. The method of claim 7, wherein the green tea extract has a solid content of about 4% before the microfiltration.

* * * * *